(12) United States Patent
Lett et al.

(10) Patent No.: US 7,669,081 B2
(45) Date of Patent: Feb. 23, 2010

(54) SYSTEMS AND METHODS FOR SCHEDULING, PROCESSING, AND MONITORING TASKS

(75) Inventors: Richard Lett, Fort Wayne, IN (US);
Gregory Renno, Fort Wayne, IN (US);
Thomas Terwiel, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 487 days.

(21) Appl. No.: 11/535,723

(22) Filed: Sep. 27, 2006

(65) Prior Publication Data

US 2008/0120620 A1    May 22, 2008

(51) Int. Cl.
*G06F 11/00* (2006.01)
(52) U.S. Cl. .......................................... 714/20; 714/15
(58) Field of Classification Search ........................ None
See application file for complete search history.

(56) References Cited

U.S. PATENT DOCUMENTS

| | | | | |
|---|---|---|---|---|
| 5,170,340 A | * | 12/1992 | Prokop et al. ................... | 700/23 |
| 5,819,066 A | * | 10/1998 | Bromberg et al. .............. | 707/102 |
| 5,960,166 A | | 9/1999 | Brown, III et al. | |
| 6,353,834 B1 | * | 3/2002 | Wong et al. ...................... | 707/202 |
| 6,421,676 B1 | * | 7/2002 | Krishnamurthy et al. ....... | 707/102 |
| 6,430,703 B1 | | 8/2002 | Connor et al. | |
| 6,757,897 B1 | | 6/2004 | Shi et al. | |
| 6,766,471 B2 | | 7/2004 | Meth | |
| 6,810,503 B1 | | 10/2004 | David et al. | |
| 6,829,764 B1 | | 12/2004 | Cohen et al. | |
| 6,904,595 B2 | | 6/2005 | Alford et al. | |

(Continued)

OTHER PUBLICATIONS

Decision on Appeal, Before the Board of Patent Appeals and Interferences, Appeal No. 2003-1070, U.S. Appl. No. 09/021,727, Paper No. 31, Dec. 9, 2003. 17 pages, www.uspto.gov/web/offices/dcom/bpai/decisions/fd031070.pdf.

(Continued)

*Primary Examiner*—Michael C Maskulinski
(74) *Attorney, Agent, or Firm*—Daly, Crowley, Mofford & Durkee, LLP

(57) ABSTRACT

A computer-implemented method for performing a process is provided. The method comprises: (a) receiving a request to perform a process, the process comprising a plurality of tasks and at least a scheduler rule; (b) receiving a plurality of checkpoints associated with the process, each checkpoint comprising checkpoint state data and at least a respective checkpoint rule governing execution of the process; (c) determining a first task of the plurality of tasks to be scheduled into a priority queue, in accordance with the scheduler rule; (d) determining the first checkpoint of the plurality of checkpoints that is to be the first checkpoint used in processing the first task, in accordance with the scheduler rule; (e) creating the checkpoint state data for the first checkpoint; (f) saving the checkpoint state data for the first checkpoint; (g) processing the first task in accordance with the checkpoint rule associated with the first checkpoint; (h) determining the next task in the plurality of tasks to perform, based on the checkpoint rule associated with the first checkpoint; (i) updating the saved checkpoint data for the first checkpoint with the data and state associated with the first task; and (j) repeating steps (c) through (i) for each subsequent task and checkpoint, in accordance with the respective scheduler and checkpoint rules, until a predetermined condition has been reached.

33 Claims, 14 Drawing Sheets

U.S. PATENT DOCUMENTS

| | | | |
|---|---|---|---|
| 7,085,831 B2 | | 8/2006 | Larkin |
| 7,363,288 B2 * | | 4/2008 | Santos et al. ................ 707/2 |
| 2005/0278699 A1 * | | 12/2005 | Buskens et al. ............ 717/120 |
| 2006/0288346 A1 * | | 12/2006 | Santos et al. ............... 718/102 |
| 2007/0277056 A1 * | | 11/2007 | Varadarajan et al. ......... 714/15 |

OTHER PUBLICATIONS

Decision on Appeal, Before the Board of Patent Appeals and Interferences, Appeal No. 96-3960, U.S. Appl. No. 08/131,056, Paper No. 17, Nov. 10, 1999, 20 pages, www.uspto.gov/web/offices/dcom/bpai/decisions/fd963950.pdf.

Integrated Mission Solutions DD(X)—Transforming Naval Technology, Technology Today, Highlighting Raytheon's Technology, Summer 2003, vol. 2, Issue 2, wwwxt.raytheon.com/technology-today/archive/2003-Issue2.pdf, 32 pages.

Berman, et al, "Application-Level Scheduling on Distributed Heterogeneous Networks (Technical Paper)" Oct. 12, 2006, www.cs.ucsd.edu/groups/hpcl/apples/sup96/html/INDEX.HTM, 27 pages.

DD(X) Total Ship Computing Environment Promises to Transform Naval Warfighting, Fleet Technology Today, DefenseNews, vol. 20., No. 34, Sep. 11, 2006, www.ratheon.com/products/stellent/groups/public/documents/content/CMS04-014882.pdf, 1 page.

DD(X) Open Architecture Computing Technologies Developed by Raytheon Hold Much Promise for Other Nay Ship Classes—Current and Future, Fleet Technology Today, DefenseNews, vol. 20., No. 48, Sep. 11, 2006, www.ratheon.com/products/stellent/groups/public/documents/content/CMS04-01528.pdf, 1 page.

Musciano, Chuck, "The job scheduling juggle", SunWorld Feature, Jul. 1998, http://sunsite.uakom.sk/sunworidonlne/swol-07-1998/swol-07-scheduling.html, 6 pages.

Bassett et al., "SOSCOE—The Glue That Holds FCS Together", Army AL&T, Sep.-Oct. 2005, www.dsci.com/document/emeryarticle.pdf, 4 pages.

DD(X) Pressroom, Related News, Navy Certifies DS(X) Total Ship Computing Environment Release 2 Software, Jun. 6, 2005, http://legacy.ddxone.com/pressroom/details/?id=33, 2 pages.

DD(X) Pressroom, Related News, Successful DD(X) Software Design Reviews Demonstrate Significant Advances in Both Infrastructure and Mission Software, Feb. 11, 2005, http://legacy.ddxone.com/pressroom/details/?id=22, 2 pages.

DD(X) National Team Overview, Related News, About DD(X), DD(X)—Transforming Mission Effectiveness, Sep. 11, 2006, http://legacy.ddxone.com/overview, 1 page.

DD(X) Pressroom, Related News, Progress of DD(X) Total Ship Computing Environment Development Effort Confirmed by U.S. Nary Design Review, Jul. 13, 2004, http://legacy.ddxone.com/pressroom/details/?id=13, 2 pages.

* cited by examiner

Note: tdm = Task Data Map

SYSTEMS AND METHODS FOR SCHEDULING, PROCESSING, AND MONITORING TASKS

STATEMENT REGARDING FEDERALLY SPONSORED RESEARCH

This invention was made with Government support under Contract N00024-04-c-2301 with the Department of the Navy. The Government has certain rights in this invention.

FIELD OF THE INVENTION

Embodiments of the invention generally relate to computer hardware and software and, more particularly, the invention relates to systems and methods that enable task scheduling, processing, and monitoring, especially as part of a scalable and configurable architecture.

BACKGROUND OF THE INVENTION

The processing unit of a computer system (e.g., a Central Processing Unit (CPU) or microprocessor) interprets and executes instructions, to accomplish processes or tasks that can process data within the system or control some device or application. Some computer systems provide multiple processors to perform different tasks or groups of tasks, and other computer systems might instead provide a single processor that is responsible for performing all of the required tasks. With either a single processor system or a multi-processor system, when the system is running multiple tasks or multiple applications at the same time, some type of scheduling becomes necessary.

An operating system running on a computer system can include some type of task scheduler process, routine, algorithm, or procedure. The task scheduler determines priority or is generally responsible for determining the priority of each task and selects and schedules tasks for performance. Task Schedulers divide up a total amount of available processing cycles or processor time available on the processing unit between the applications and/or various tasks that must be performed (sometimes referred to as "time slicing"). Many different task scheduling techniques and/or algorithms have been employed. A few examples include load control scheduling, priority-based scheduling, First In First Out (FIFO) scheduling, rate monotonic scheduling, and round robin scheduling.

In some environments, the computer system and its operation (e.g., the computer hardware and software) are custom and application specific. Consider, for example, military applications such as the U.S. Navy. Throughout the Navy's fleet, computer hardware and software systems have long tended to be unique to particular ships or classes of ships. Even on a single ship, there can be multiple independent computer systems dedicated to specific functions, such as operating the radar and sonar, navigating the ship, gathering intelligence, firing guns and missiles, controlling shipboard power systems, tracking spare parts inventories and training the crew.

Such "all-unique" computer systems are examples of so-called "closed" architectural designs (also referred to as "stovepiped" designs). That is, such closed architectural systems usually operate independently, in parallel and incompatibly with each other. Such systems frequently cannot communicate freely with other computers in any capacity (for example, as hosts, peers or clients), unless those other computers are of the same type, running the same software operating systems and applications. Thus, designing, building, maintaining and, above all, using multiple closed architecture computer systems can be very expensive, time consuming and labor intensive. In addition, multiple systems may necessitate multiple teams of system operators and support technicians, multiple spare parts inventories, multiple installations, and multiple support infrastructures.

To help overcome the limitations of the closed architectural designs, some organizations, including the Navy, are migrating to more efficient and cost-effective approaches to computing. One efficient and cost-effective approach being considered is using so-called "open architecture" (OA) systems, which have long been employed in many non-military industries. OA systems are designed to be integrated and interoperable with each other and can have published specifications, which let lets third parties develop add-on hardware or software for a computer or device that is part of the OA system. In many instances, a single OA system, and its users, can more effectively handle the heavy workloads that formerly required a variety of different systems and many more personnel. To achieve a high level of inter-operability and "openness" in an OA system, the OA system uses common communications standards and protocols, paired with affordable, widely available Commercial-off-the-Shelf (COTS) hardware and software. One example of a widely adopted OA system in commercial use is the Internet technology that sustains both the public World Wide Web and similar private (secure) corporate intranets.

The U.S. Navy's first large scale OA system implementation is the so-called Total Ship Computing Environment (TSCE), which comprises a single computer network infrastructure that supports various layers of interoperable application software programs. Raytheon Corporation of Waltham, Mass. developed the TSCE for use with a specific Navy vessel, the next-generation DD(X) multi-mission destroyer. DD(X) is a family of ships, including the DD(X) multi-mission destroyer that will be the U.S. Navy's first ship of the next-generation surface combatants). It is expected that the TSCE design will find application in many military and non-military applications in addition to the DD(X) program.

TSCE consists of an application software layer (such as a DD(X) tactical application software layer) running on top of the Total Ship Computing Environment Infrastructure (TSCEI or TSCE-I). The TSCEI includes several layers—comprising hardware, operating system, middleware and infrastructure services. The TSCE software environment is a service-based architecture where each element of the software environment (infrastructure and applications) is treated as a service provider to the system. At the lowest level, a service equates to a single software object that resides in the TSCE. TSCE software services populate all of the hardware resources that make up the TSCE physical environment. For example, an application can reside in a ship's data center, shore site, or a remote access device such as a PDA. The location of the device or its type makes no difference, as long as the device provides the necessary computing resources.

One advantage of the TSCE is that a user (e.g., the U.S. Navy) can move away from the closed systems (and closed software) previously developed at great expense for particular applications. Many closed systems, especially those in use in the military, include special purpose variants of many functions that could individually be genericized and made into reusable patterns or components. By using TSCE instead of closed software systems, the user (e.g., U.S. Navy) can achieve faster deployment times, easier upgrading of deployed systems and lower life cycle costs. Advantageously, the TSCE is constructed to be flexible and extensible to meet all current and future U.S. Navy missions, encompassing command, control, communications and computers/intelligence, surveillance and reconnaissance (C4/ISR) and combat systems. The TSCE also extends ashore to support DD(X) maintenance, logistics, training and other deployment functions Services are deployed to the TSCE, locate each other through lookup and discovery mechanisms, and are assimilated into the software environment as peers in the service community. Because TSCE is open, services can join and leave the TSCE as the mission/operational requirements of the system change. More importantly, the system has the ability to move services dynamically when a failure or casualty occurs, yielding the maximum system reliability, scalability and availability in a dynamic changing computing environment. The DD(X) open standards-based approach to the TSCE detaches applications from hardware and software, eradicates rigid weapon-sensor pairings, and eliminates the need for independently managed tactical software programs.

SUMMARY OF THE INVENTION

Controlling the operation of a computer system (and computer applications running on the computer system) also involves issues such as prioritizing tasks, monitoring tasks, providing a fail-over strategy should the computer system or application encounter a problem, saving the state of the computer system and/or an application if the computer system and/or application must be stopped, and recovering the computer system and/or application after the program has been stopped.

One way to save the state of a computer system is by creating a "snapshot" or "restore point" that stores the state of a running computer system in a predetermined repository, such as a file or hard disk. Restore points can be established in various ways, including upon user initiation, periodically, triggered by an external event, etc. When a restore point is used, if the computer system later fails, the computer system can be restored to a previous restore point by using information from the snapshot (e.g., a recovery file) to recreate the computer systems' state at the time the restore point was made. The computer system can then resume execution from the restore point. It can be advantageous if restore points also are established and used for applications running on a computer system, but known recovery systems don't provide the ability to save the state of an application or a high level process at user/developer defined points.

To handle scheduling, various types of operating systems have various types of schedulers. For example, the UNIX operating system provides a scheduling feature called "cron". Cron handles simple job scheduling, at the operating system level, in the form of an ability to start a Unix command at a specific time, based upon sufficient date and time matching criteria. For example, if a user wants to tell a system to perform a backup every night at midnight, the user can use the cron feature. The Unix chron scheduler is not able to connect the execution of a first job with the results of a second job, and cron cannot start jobs that aren't time dependent. Thus, a developer can't use Unix cron to run a job based on a non-time-dependent condition (such as when an error occurs, or when a system resource becomes available), nor can a developer tell the cron scheduler conditional ways that job flow can change. Job scheduling on mainframe computers is also done at the operating system level, but can provide more features than the Unix Scheduler, including the ability to trigger running a job using some types of non-time-based criteria, such as if a certain system activity occurs (e.g., a database is shut down). However, there are few, if any, schedulers that provide a scheduling capability at the application-level.

In one aspect, the invention provides a software architectural framework that supports the processing of tasks, including application-level tasks, via multiple priority queues. The framework allows a user/developer to break down a logical thread of processing into smaller parts that are modeled as processor functions that allow for an elevated amount of software reusability, where the processor function is responsible for some common functionality.

The state of a logical thread is modeled as a task that is passed between processor functions. When a processor function accepts a Task, the processor function uses data within the task, as necessary, and stores the output data in the task. This output data in turn becomes the input data for the next processor function. Selecting the next processor function is supported through the use of developer-provided rules (also referred to herein as strategy patterns). Each rule encapsulates the decision making necessary for selecting the next processor function. A task scheduler gets directed by these rules to select the next processor.

Through the use of these rules, the integrity of the original logical thread of processing is maintained. Tasks are consequently placed in a priority queue as they wait to be sent to the next selected processor function. Before a task is placed on a queue it is saved to persistent storage using primary keys known only to the task scheduler. This step allows for the recovery of the task data placed on the queues. Each priority queue and processor function is allocated its own thread. A task processor manages the priority queue, processor function, and thread. In the case where an immediate mission/high priority message/task is received, in at least one embodiment, all task processors halt their threads. The immediate task is allowed to go through its needed processor functions. Once the immediate task has completed going through all its processor functions, the task processors resume their normal dispatching of tasks from the priority queues.

In one aspect the invention provides a computer-implemented method for performing a process, the method comprising:

(a) receiving a request to perform a process, the process comprising a plurality of tasks and at least a scheduler rule;

(b) receiving a plurality of checkpoints associated with the process, each checkpoint comprising checkpoint state data and at least a respective checkpoint rule governing execution of the process;

(c) determining a first task of the plurality of tasks to be scheduled into a priority queue, in accordance with the scheduler rule;

(d) determining the first checkpoint of the plurality of checkpoints that is to be the first checkpoint used in processing the first task, in accordance with the scheduler rule;

(e) creating the checkpoint state data for the first checkpoint;

(f) saving the checkpoint state data for the first checkpoint;

(g) processing the first task in accordance with the checkpoint rule associated with the first checkpoint;

(h) determining the next task in the plurality of tasks to perform, based on the checkpoint rule associated with the first checkpoint;

(i) updating the saved checkpoint data for the first checkpoint with the data and state associated with the first task; and (j) repeating steps (c) through (i) for each subsequent task and checkpoint, in accordance with the respective scheduler and checkpoint rules, until a predetermined condition has been reached.

The predetermined condition can comprise determining that the process has finished, checking a rule to determine whether the process has finished, and/or receiving an instruction to process the tasks in a specific order (e.g., where the specific order deviates from the order specified in at least one of the scheduler and checkpoint rules.) The predetermined condition also can comprise receiving a second request to perform a process, where the second request has a higher priority than the first request, determining that a task has not been scheduled properly, determining that a task has not been processed correctly, determining that a task is unhealthy, and/or receiving an instruction to pause or stop the performing of the process.

In one embodiment, the method further comprises the steps of: (k) retrieving a stored checkpoint associated with the task that did not process correctly; (l) recovering the failed task using the retrieved checkpoint; and (m) repeating steps (d) through (j). Also, the method can further comprise polling during at least one of steps (a) through (j) to determine whether processing of a task occurred correctly.

In one embodiment, each checkpoint is allocated a respective thread and a priority queue, and the method further comprises polling each thread to determine whether the thread is healthy. The method can further comprise reporting when a task has been processed and, optionally, determining how long it takes for a given task to be performed.

A notification can be sent providing information regarding the progress made in performing the process and/or if a task is unhealthy. If a task is unhealthy, the method can further include performing at least one of the following actions: (i) restarting the task; (ii) ending the task; and (iii) moving processing to a different task In another aspect, the invention provides a method for processing a logical thread, comprising the steps of:

(a) dividing the logical thread into a plurality of processor functions;

(b) modeling the state of the logical thread as a first task that is passed between processor functions, the first task comprising first task data and a first task state;

(c) adding the first task to a queue of tasks;

(d) persisting the first task in a first checkpoint;

(e) selecting a first processor function for processing the first task in accordance with a first rule;

(f) receiving the first task at a first processor function and using the first task data to perform a first process on the task;

(g) storing the output data from the first process in the first task;

(h) persisting the first task in a second checkpoint;

(i) selecting a second processor function for processing the first task in accordance with a second rule; and (j) receiving the first task at the second processor function, wherein the second processor function uses the output data from the first process, if necessary, as the input data to the second process.

Task data that is used across processor functions can be tracked. The tracked task data can be removed when all processor functions are complete. The modeling can further comprise modeling the state of the logical thread as a second task that is passed between processor functions, the second task comprising first task data and a first task state and further comprising the steps of adding the second task to the queue of tasks; persisting the second task in a third checkpoint; and selecting the next task to be processed by the processor functions in accordance with a predetermined priority.

In still another aspect, the invention provides a computerized system for executing a process, the system comprising means for receiving requests to execute a business process and for providing responses to the requests; means for processing incoming requests in accordance with a predetermined priority method; means for saving data relating to the state of processing of the incoming request at one or more checkpoints; and means for recovering data from a checkpoint, to restore the business process.

The invention can further comprise means for checking the health of the business process, means for pausing the business process to permit a higher priority activity to occur, and/or means for changing the way the business process executes.

Details relating to these and other embodiments of the invention are described more fully herein.

BRIEF DESCRIPTION OF THE FIGURES

The advantages and aspects of the present invention will be more fully understood in conjunction with the following detailed description and accompanying drawings, wherein.

The drawings are not necessarily to scale, emphasis instead generally being placed upon illustrating the principles of the invention.

DETAILED DESCRIPTION

Before discussing the details of the invention, a preliminary discussion is provided giving an overview of the type of computing environment in which at least some embodiments of the invention are realized. Systems and methods in accordance with the invention can be implemented using any type of general purpose computer system, including but not limited to a personal computer (PC), laptop computer, server, workstation, personal digital assistant (PDA), mobile communications device, interconnected group of general purpose computers, and the like, running any one of a variety of operating systems. An example of a general-purpose computer system 10 usable with at least one embodiment of the present invention is illustrated in FIG. 1.

Figure 1:
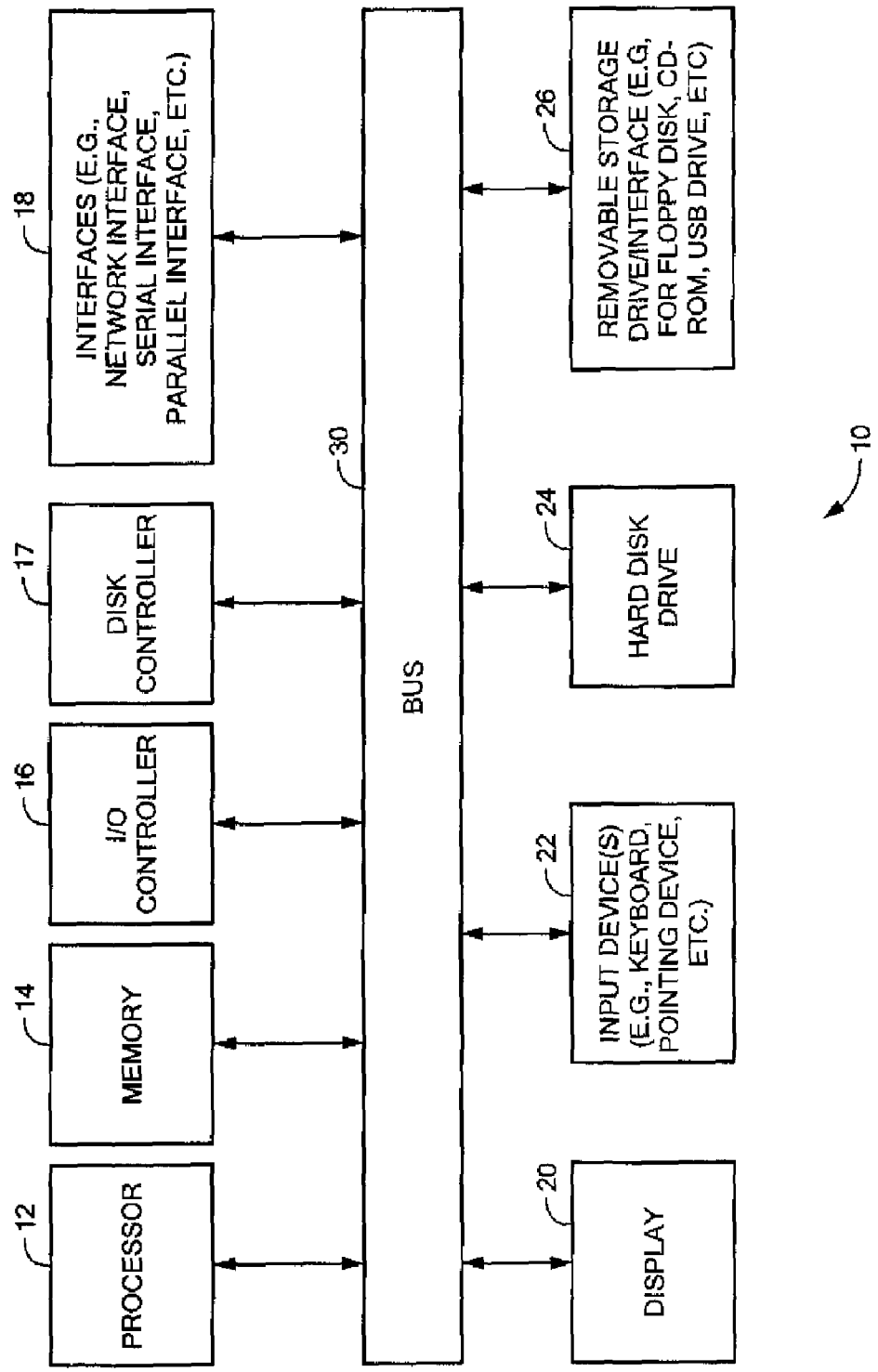
FIG. 1 is a block diagram of a computer system in which at least one embodiment of the present invention can be embodied.

Referring briefly to FIG. 1, the general purpose computer system 10 includes a central processor 12, associated memory 14 for storing programs and/or data, an input/output controller 16, a network interface 18, a display device 20, one or more input devices 22, a fixed or hard disk drive unit 24, a floppy disk drive unit 26, a tape drive unit 28, and a data bus 30 coupling these components to allow communication therebetween.

The central processor 12 can be any type of microprocessor, such as a PENTIUM processor, made by Intel of Santa Clara, Calif. The display device 20 can be any type of display, such as a liquid crystal display (LCD), cathode ray tube display (CRT), light emitting diode (LED), and the like, capable of displaying, in whole or in part, the outputs generated in accordance with the systems and methods of the invention. The input device 22 can be any type of device capable of providing the inputs described herein, such as keyboards, numeric keypads, touch screens, pointing devices, switches, styluses, and light pens. The network interface 18 can be any type of a device, card, adapter, or connector that provides the computer system 10 with network access to a computer or other device, such as a printer. In one embodiment of the present invention, the network interface 18 enables the computer system 10 to connect to a computer network such as the Internet.

Those skilled in the art will appreciate that computer systems embodying the present invention need not include every element shown in FIG. 1, and that equivalents to each of the elements are intended to be included within the spirit and scope of the invention. For example, the computer system 10 need not include the tape drive 28, and may include other types of drives, such as compact disk read-only memory (CD-ROM) drives. CD-ROM drives can, for example, be used to store some or all of the databases described herein.

In at least one embodiment of the invention, one or more computer programs define the operational capabilities of the computer system 10. These programs can be loaded into the computer system 10 in many ways, such as via the hard disk drive 24, the floppy disk drive 26, the tape drive 28, or the network interface 18. Alternatively, the programs can reside in a permanent memory portion (e.g., a read-only-memory (ROM)) chip) of the main memory 14. In another embodiment, the computer system 9 can include specially designed, dedicated, hard-wired electronic circuits that perform all functions described herein without the need for instructions or methods from computer programs.

In at least one embodiment of the present invention, the computer system 10 is networked to other devices, such as in a client-server or peer-to-peer system. The computer system 10 can, for example, be a client system, a server system, or a peer system. In one embodiment, the invention is implemented at the server side and receives and responds to requests from a client, such as a reader application running on a user computer.

The client can be any entity, such as the computer system 10, or specific components thereof (e.g., terminal, personal computer, mainframe computer, workstation, hand-held device, electronic book, personal digital assistant, peripheral, etc.), or a software program running on a computer directly or indirectly connected or connectable in any known or later-developed manner to any type of computer network, such as the Internet. For example, a representative client is a personal computer that is x86-, PowerPC.RTM, PENTIUM-based, or RISC-based, that includes an operating system such as IBM-.RTM, UNIX, HP UX, LINUX, OS/2.RTM. or MICROSOFT WINDOWS (made by Microsoft Corporation of Redmond, Wash.) and that includes a Web browser, such as MICROSOFT INTERNET EXPLORER, NETSCAPE NAVIGATOR (made by Netscape Corporation, Mountain View, Calif.), having a Java Virtual Machine (JVM) and support for application plug-ins or helper applications. A client may also be a notebook computer, a handheld computing device (e.g., a PDA), an Internet appliance, a telephone, an electronic reader device, or any other such device connectable to the computer network.

The server can be any entity, such as the computer system 10, a computer platform, an adjunct to a computer or platform, or any component thereof, such as a program that can respond to requests from a client. Of course, a "client" can be broadly construed to mean one who requests or gets the file, and "server" can be broadly construed to be the entity that sends or forwards the file. The server also may include a display supporting a graphical user interface (GUI) for management and administration, and an Application Programming Interface (API) that provides extensions to enable application developers to extend and/or customize the core functionality thereof through software programs including Common Gateway Interface (CGI) programs, plug-ins, servlets, active server pages, server side include (SSI) functions and the like.

In addition, software embodying the present invention, in one embodiment, resides in an application or other program running on the computer system 10. In at least one embodiment, the present invention is embodied in a computer-readable program medium usable with the general-purpose computer system 10. In at least one embodiment, the present invention is embodied in a data structure stored on a computer or a computer-readable program medium. In addition, in one embodiment, the present invention is embodied in a transmission medium, such as one or more carrier wave signals transmitted between the computer system 10 and another entity, such as another computer system, a server, a wireless network, etc. The present invention also, in an embodiment, is embodied in an application programming interface (API) or a user interface. In addition, the present invention, in one embodiment, is embodied in a data structure.

Having described examples of computing environments, illustrative embodiments of the invention will now be described. Note that, in the following description, the framework and system described herein is illustratively shown as being in communication with the aforementioned TSCE-I environment by way of example only. Those of skill in the art will recognize that this example and area of use (e.g., U.S. Navy) is in no way limiting. The TSCE-I environment is but one application of the invention. At least some embodiments of the invention described herein have applicability and utility in virtually any type of environment capable of using reusable design patterns and states, task scheduling systems, and monitoring systems.

The following provides a detailed explanation of the functions and operations of several embodiments of the invention.

Figure 2:
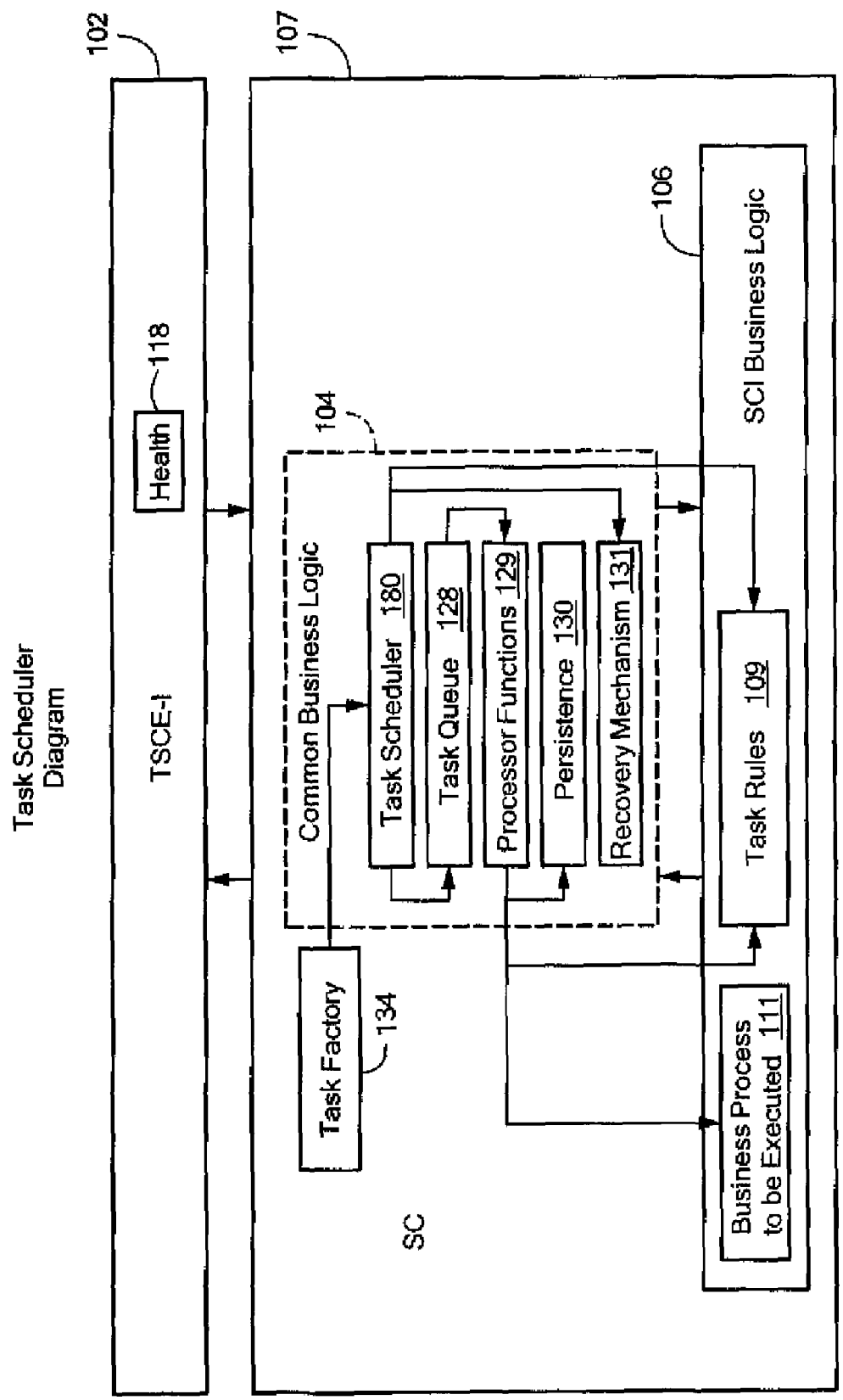
FIG. 2 is a block diagram illustrating the elements of a system including a scheduler, in accordance with one embodiment of the invention.

FIG. 2 is a block diagram 100 illustrating the elements of the framework of a scheduler 104 implemented in accordance with at least one embodiment of the invention. The block diagram 100 of FIG. 2 shows the scheduler 104 implemented in an open architecture (OA) environment, which is shown by way of example as the Total Ship Computing Environment Infrastructure (TSCE-I) 102. The scheduler 104 is in communication with the TSCE-I 102 and with one or more external software configuration items (SCI) 107 via SCO specific business logic 106. As will be seen herein, the framework of the scheduler 104 emulates a standard scheduling mechanism, such as an operating system scheduling mechanism, in some ways but provides additional capabilities and features not available in existing schedulers, such as providing, at an application level, the ability to control the operation of a task in a conditional manner, through one or more rules, the ability to control the flow of a task, the ability to save a process's state at any point the software developer desires (including upon the occurrence of a predetermined, non-time-related condition), and the ability to recover or restart from a failed task within an application.

The environment in which the scheduler 104 operates is, in one embodiment, a layered architecture having two layers of abstraction: the scheduler 104 and a software configuration item (SCI) layer, which includes the SCI business logic component 106 and the SCI itself 107. The scheduler 104 serves as a central communications point with the TSCE-I 102 and other external applications and provides de-coupling of the task scheduler from external interactions and external dependencies. The SCI specific business logic 106 provides the logic (e.g., rules that govern the execution of the tasks), for the specific business application function being provided to the scheduler 104, such as the SCI 107. The scheduler 104 includes a task queue 128, a processor function 129, a persistence module 120, a recovery mechanism 131, and a task scheduler 180. Each of these is explained further below.

The initialization module 116 provides the model for sequencing the events during each SCI phase (i.e., the time period that an SCO is using the scheduler 180), including events such as booting, starting, and termination. The health module 118 monitors the health of SCI components running on the scheduler 104. The Task Scheduler reports a periodic health to the health module 118. The recovery mechanism restores 131 the last known safe state of an SCI by restoring an SCI-related tasks running on the scheduler 104 to a last known good state. The Task Scheduler 180 monitors the threads of the Processor Functions (PF) 129; if one does not check in with its health in a developer configured amount of time the thread can be restarted. Optionally, the SCI can be reported as unhealthy or the offending task can be removed so all other tasks within the Processor Functions 129 Task Queue 128 can be processed. The persistence module 130 stores state data and other relevant data at predetermined times, such as when a processor function/checkpoint (described further herein) is completed, when a task begins, ends, pauses, resumes, or is restarted, and/or at other times defined by user or developer, such as through one or more rules (described further herein.

The scheduler 104 is in operable communication with the TSCE-I 102. The Task Scheduler 180 allows the scheduler 104 to interrupt a thread and/or recover a thread.

Advantageously, the scheduler 104 provides Application Program Interfaces API's that are implemented by the developer. This allows for a significant amount of reusable code. For example, in one embodiment, a software configuration item (SCI) 107 is implemented using the SCI Specific Business logic 106 in cooperation with the scheduler 104 as described further herein, an extensible markup language (.XML) file to configure the Scheduler, and as few as four small classes, totaling about 50 source lines of code (SLOC).

Referring to FIG. 2, the scheduler 104 provides task schedulers, persistence, task processing, and task queue, processor function 129 (also referred to herein as "checkpoint") functionality (although the actual business processing to accomplish these functions is specific within an SCI), and a recovery mechanism 131. The task scheduler module 180 (which is explained in greater detail further in connection with FIGS. 3 through 16) provides functions including restoring state, prioritizing messages, enabling tasks to hold process information, monitoring thread health, and providing persistence (via persistence module 130). The task factory module 134 creates the tasks, and its operation is explained further.

The SCI Specific Business logic 106 provides a scheduler 104 that it is in communications with one or more rules 109 that govern the way a set of tasks will execute, as well as one or more tasks 111 to be executed. At least some of these rules are used by the common business component 112 described above.

The Task Scheduler 180 provides interfaces that can be implemented so each component may assess its own health independently. The health module 118 receives health information from the Task Scheduler 180, or any other source or component that an application developer opts to use. For example, when a task is received and takes an unusually long time to process, then the health could be reported as degraded by the Task Scheduler 180. Generally, the health module 118 does not necessarily know how each SCI assesses its health information. In addition, the persistence module 130 does not provide the health module 118 with its health information; rather, health of the persistence module 130 is taken care of in the scheduler 104. In addition, health of the common business component 107 is assessed (indirectly) by the Task Scheduler 180.

In FIG. 2, a message is received from TSCE-I 102. The message is turned into a task through the task factory 134 and submitted to the task scheduler 280. The task scheduler 180 looks at the associated rule and adds the task to a queue (e.g., task queue 128). The processor function 129 has a thread attached to it that processes the task queue 128. Tasks are scheduled based on priority. The processor function 129 removes the next task and calls into the SCI business logic 106. There are interfaces (not shown, but understood by those of skill in the art) that the SCI Business logic 106 implements, so that the processor function 129 knows what to call. Once the SCI Business logic 106 is done processing the task it inserts any data it wants to save into a task data map (see FIG. 8). The processor function 129 gets the task returned to it with the task data map and persists the state of the SCI 107. After persisting, the processor function 129 checks the rules and adds the task to the next processor function task queue 128. The next processor function repeats the same behavior.

If an SCI 107 fails, the task scheduler 180 automatically goes to the recovery mechanism 131 (described further herein) and recovers all tasks, looks at each task's rule, and puts the task on the appropriate task queues for processing. This is done whenever an SCI 107 is started, to recover or pick up where processing left off.

Figure 3:
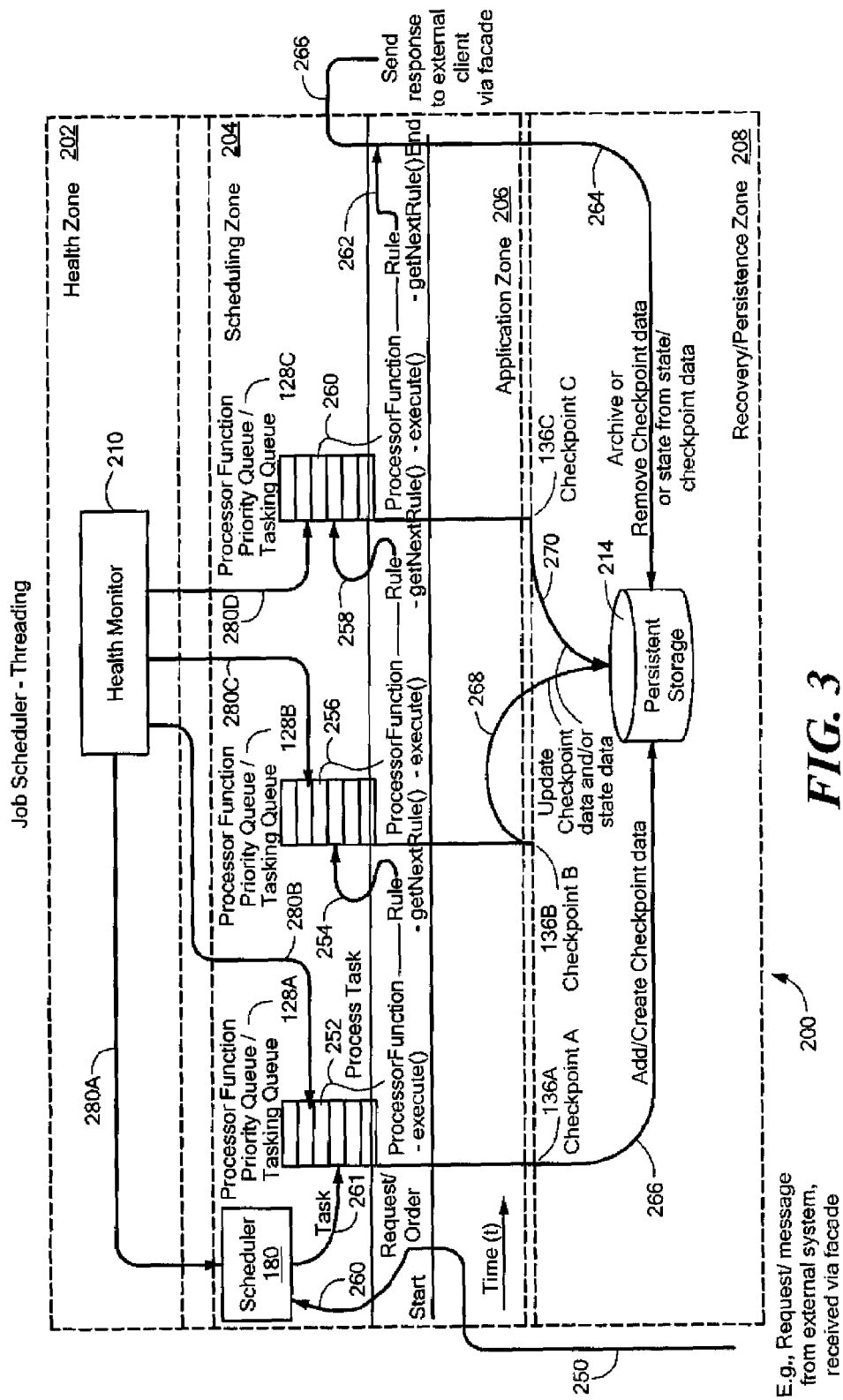
FIG. 3 is a diagram illustrating the operation of the tasking queue, task threading, and processor functions, for the system of FIG. 2.

FIG. 3 is a Scheduler operation diagram 200 illustrating the operation and threading for the tasking queue 128 and task scheduler 180 of the system of FIG. 2. Referring now to FIGS. 2 and 3, the tasking queue 128 is a mechanism that allows a process to restore its state and elevant data after a failure. The task scheduler operation depicted in FIG. 2 is able to persist state data at defined application checkpoints, recover an application starting from last completed checkpoint, provide a priority scheme for processing incoming requests, and create a pattern for defining application checkpoints and high-level processing flow. The task queue 128 effectively operates as a state machine with dynamic characteristics. In addition, the task queue 128 provides a mechanism for allowing priority messages to process first. All tasks within an SCI send all business events/messages to the task scheduler 180, allowing the task scheduler to maintain the health of the threads and to persist the state/checkpoint information. In addition, in the illustrative diagram of FIG. 3, the task scheduler 180 is implemented as part of a system that is in communication with a health monitor 210.

Referring now to FIG. 3, the diagram 200 of task scheduler activity flow shows processing occurring over four zones: a health zone 202, a scheduling zone 204, an application zone 206, and a recovery/persistence zone 208. The health zone 202 includes a health monitor 210. Each is described further herein. The scheduling zone 204 includes a scheduler 210 and a plurality of processor function priority queues 216A, 216B, 216C, each of which has a priority attribute; the task scheduler uses a queue/thread in each processor function. The application zone includes checkpoints A, B, and C. The recovery/persistence zone 208 includes persistent storage 214. The persistent storage is used as part of the process where data is checkpointed at the beginning of a processor function and between processor functions (see threads 266, 268, 270, and 274), Overall operation of the task scheduler follows this basic interface pattern:

(1) StartTask
(2) Restore
(3) addProcessorFunction (including functions such as Consume and getId)
(4) removeProcessorFunction
(5) checkHealth Each of the above steps, along with the operations shown in FIG. 3, is described further below in connection with the flowcharts of FIGS. 6-11.

Referring to FIG. 2 and FIG. 3, at a high level, the task scheduler 180 operates on an input or message it receives (e.g., a method invocation or a publish/subscribe request) and ultimately produces a corresponding output or response message. For example, in FIG. 3, the scheduler 180 receives an external message (thread 250) such as via TSCE-I 102. The message is translated into a task through the task factory and a resultant task is passed to the scheduler 180 (thread 260). The message can, for example, be from the SCI business logic 106 of another SCI requesting that a process be performed, the process consisting of one or more tasks to be executed. The SCI business logic 106 thus creates the task(s) and the scheduler 180 schedules, executes, and monitors them.

In one embodiment, the scheduler 180 is implemented using a manager thread, which adds entries to the appropriate checkpoint priority queue/processor function priority queue 128A (also referred to herein as a task queue 128A). After the checkpoint thread is finished processing, the processor function 129 advances the state of the task (a task is an object that contains state and relevant data that has been altered or created during checkpoint processing) to the next checkpoint/processor function and adds the task to the appropriate checkpoint/processor function task queue 128. The task in the example of FIG. 3 is processed, where a process exists to process information and/or data. The process could, for example, be a process used by an SCI 107.

Figure 4:
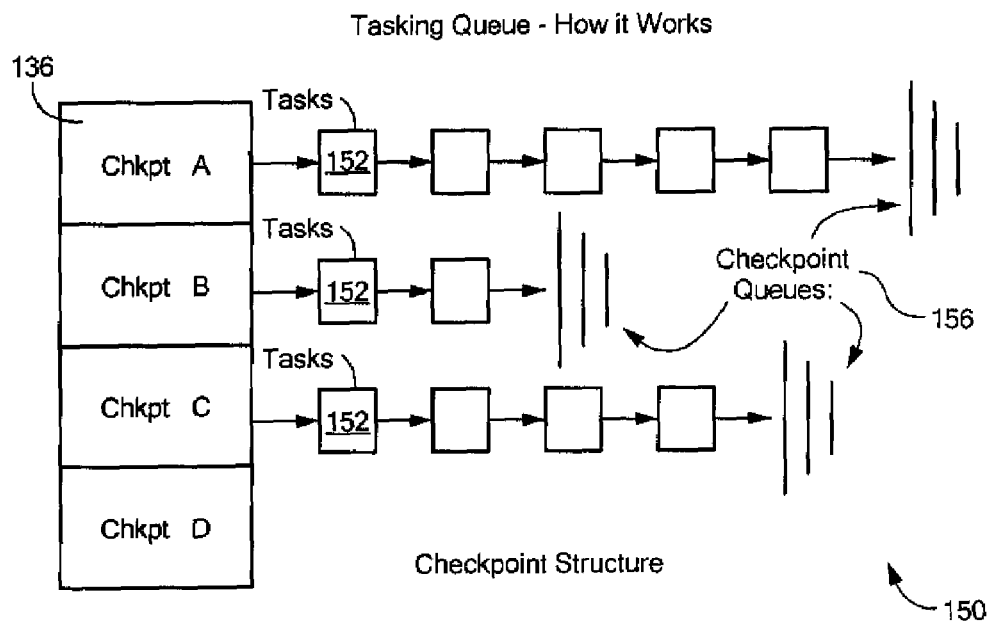
FIG. 4 is a diagram showing the checkpoint structure used with the task scheduler of FIGS. 2 and 3.
Figure 5:
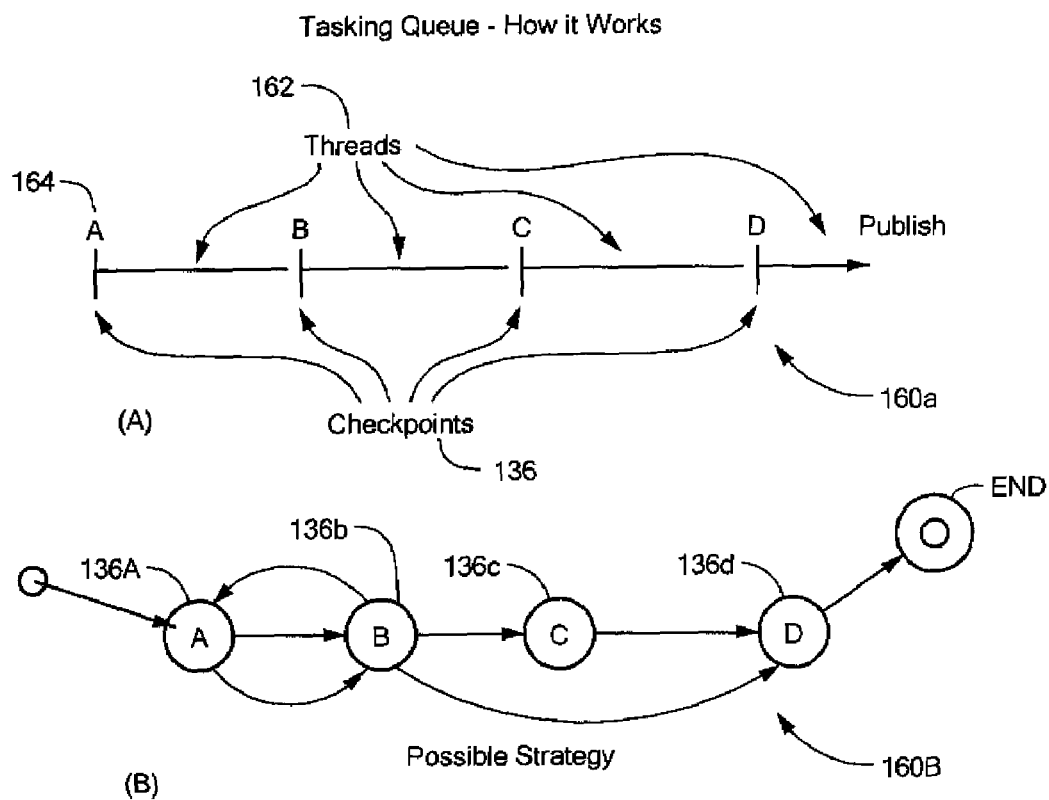
FIG. 5A is a diagram showing checkpoint and thread flow for the task scheduler of FIGS. 2 and 3.
FIG. 5B is a diagram showing a rule for checkpoint flow, for the task scheduler of FIGS. 2 and 3.

The processing done in an SCI 107 can be logically broken up into parts or tasks 152, as shown in FIG. 3 and in FIG. 4, the latter of which is a checkpoint structure diagram 150 showing the checkpoint structure used with the tasking queue operation diagram 200 of FIG. 3. The SCI 107 provides a first task 152 for the process, and adds the task 152 (thread 261) to the tasking queue 128A. A task 152 can carry data between checkpoints (which are described below), and a task 152 is recoverable. Before processing starts, the state of the data is saved to persistent storage 214 (thread 266). Note that, although persistent storage 214 is illustrated in the embodiment FIG. 3 as being separate from the scheduler 104, in at least one embodiment, the scheduler 104 also can be implemented to include the persistent storage 214, as well. Advantageously, however, the persistent storage 214 is implemented in a manner such that it is separate from the scheduler 104 doing the processing of tasks, to help ensure that the persistent storage 214 is able to provide task recovery should there be a problem with the task processing.

Part of the tasking queue 128A's functionality includes segregating business processing (i.e., processes/tasks that it receives from the SCI business logic 106) to logical services/states. Logical Services are also referred to herein as checkpoints 136, and each process can be divided into checkpoints 136 (e.g., checkpoints 136A, 136B, and 136D of FIG. 3). Each checkpoint 136 effectively has "intelligence" because the checkpoint includes and is associated with one or more rules that tell how the checkpoint 136 is to proceed. FIG. 5A is a checkpoint and thread flow diagram 160A for the tasking queue operation diagram 200 of FIG. 3, and FIG. 5B is a rule/strategy pattern diagram for checkpoint flow, for the tasking queue operation diagram 200 of FIG. 3. Examples of checkpoints include checkpoints 136A, 136B, 136C of FIG. 3, checkpoints 136A, 136B, 136C, and 136D in FIGS. 5A, and 5B, or checkpoints A through D of FIG. 4. After each task 152 has been completed, a checkpoint 136 exists, and checkpoints 136 can have a queue of tasks that are operated on (see, e.g., FIG. 8). Checkpoints 136 are threads that also provide status information; in addition, each checkpoint 136 also has its own rule associated with it, and the SCI 107, working with the scheduler 104, can have a number of threads running concurrently. There can be as many or as few checkpoints 136 as needed. Note also that a checkpoint can be associated with more than one task and can be reused by more than one task (or even the same task). See, e.g., FIG. 4, which shows that checkpoint A is associated with five different tasks and also FIG. 5B, which shows checkpoint 136A being revisited.

Each checkpoint contains its own thread. There can be multiple threads running at once, after the thread has finished processing the task it is persisted/checkpointed and the rule is interrogated to determine which task queue to add the task to. A given checkpoint 136 does a defined set of processing (i.e., the checkpoint runs the task 152), and the example checkpoints 136 of FIGS. 3-5B are linked together (via one or more predetermined rules or strategy patterns) to process inputs. For example, in FIG. 3, checkpoint 136A links to checkpoint 136B via first process task thread 252. Further, a given checkpoint 136 can be associated with a first rule (or set of rules) while being used by a first SCI 106 and with a second rule (or set of rules) when the same checkpoint 136 is being used by a second SCI 106.

The rule linking checkpoints together is preferably predetermined, such as being provided in the SCI business logic 107 by a developer or user. In at least one embodiment, even if the rule is predetermined, the rule operates as if it were dynamic and/or data/condition driven. This allows checkpoints to be revisited and/or bypassed/skipped based on whether a predetermined condition exists (such as if data has a certain value). For example, consider the possible rules that are applicable to the checkpoint flow shown in FIG. 5B, which links checkpoints 136A, 13B, 136C, and 136D together. An illustrative example of a possible rule/strategy pattern for FIG. 5B is as follows:

(1) Process tasks associated with check point 136 A;

(2) If tasks associated with checkpoint 136A are complete, process tasks associated with checkpoint 136B;

(3) If first predetermined condition exists (e.g., data has a certain value, certain system conditions are present etc.) after tasks associated with checkpoint 136B are complete, process tasks associated with checkpoint 136C;

(4) If second predetermined exists after tasks associated with Checkpoint B are complete, process tasks associated with Checkpoint D (i.e., bypass Checkpoint C);

(5) Else (i.e., if neither first nor second condition exists after tasks associated with checkpoint 136B are complete), process tasks associated with checkpoint A (and repeat from Checkpoint A onward);

(6) If tasks associated with checkpoint 136C are complete, process tasks associated with checkpoint 136D;

(7) If tasks associated with checkpoint 136D are complete, tasking queue is complete and proceeds to END.

With the rule/strategy pattern example of FIG. 5B, checkpoints can be revisited and/or skipped. As those of skill in the art will appreciate, the rule/strategy pattern represented by steps (1)-(7) above is but one of many possible rules applicable to the example checkpoint flow of FIG. 5B, and is but one rule/strategy pattern that is possible for the embodiments of the invention.

As another example, referring to FIGS. 5A and 5B, a first developer can create a state and processor function associated with checkpoint B, and apply them using a first set of rules, then a second developer can re-use this state and processing functions of the state associated with checkpoint B that the first developer created in a new state associated with checkpoint D, but the second developer applies them to checkpoint D using a second (different) set of rules. This can be done without problems (i.e., without the second developer's actions affecting the first and vice versa) because each checkpoint is a separate thread that can fix itself.

Referring again to FIGS. 2, 3, 4, 5A, and 5B, at the end of each checkpoint 136 (i.e., after the associated task processing is complete), the state of data has an opportunity to persist, if necessary. For example, in FIG. 3, after the processing associated with checkpoint 136A is complete (threads 252-254), checkpoint data is saved to persistent storage 214 (thread 268) before processing begins at checkpoint B 136B, and the checkpoint 136B can return an entry to the tasking queue 128B. Similar persisting occurs at the other checkpoints. In the example of FIG. 3, the state of the data is saved before processing starts and again at the end of each checkpoint 136. Persisting the relevant data and state helps allow for a fail over mechanism. If an SCI 107 or any of its processes or threads is terminated or fails for some reason, the state and relevant data have been saved. If a fail over is necessary, at start up after the fail over, the SCI 107 can retrieve the state and relevant data and repopulate the queues.

Once the processing has completed (e.g., after checkpoint 136D in FIG. 3), the state data (also referred to as the "keys" to the data) can be deleted/removed (thread 265) or archived. The keys to the data are passed along in the outgoing message (thread 266). In addition, once the processing has completed for a given checkpoint the rule is queried and the task is added to the next checkpoint queue In at least some embodiments of the invention, various events and/or conditions can interrupt and/or stop a process that is running. For example, if a process receives a terminate message (e.g., from the TSCE-I 102 or from the SCI 107), then task scheduler module 180 stops processing of the queues. The entries that are currently being processed are allowed to move to their next checkpoint and when all threads have reported to the task scheduler 180 the task scheduler 180 sends a message to TSCE-I that it is ready and able for an orderly shutdown.

In one embodiment of the invention, a priority scheme is implemented to give high priority messages have their own special path/thread in the queuing mechanism. When a high priority message is received at the scheduler 104, the high priority message given a state and an entry is added to the priority queue. All threads are notified that a high priority entry has been received and all queues stop processing lower priority entries until the high priority entries have been processed. The low priority entries that were in process are allowed to finish to the next checkpoint and then the threads are kept waiting until the high priority entry has finished processing. Once the high priority entry has finished processing the task scheduler 180 is alerted and all the lower priority entries are allowed to resume processing. The threads that were interrupted are not preempted; rather these threads are merely stopped in an orderly fashion until the high priorities have been processed.

The Scheduler 104 as described above provides several additional advantages for at least some embodiments of the invention. Using a Scheduler 104 facilitates development of checkpoints by individual developers and/or sites, enabling the scheduler 104 to maintain flexibility. Use of a Scheduler 104 also makes software development (especially application/SCI development) simpler, because all a developer needs to be concerned with is meeting the application/SCI's functionality requirements, not the processing, recovery, backup, or fail-over associated with the execution of the application/SCI 107. The Scheduler's 104 use of checkpoints helps provide a fail-over mechanism and enables the scheduler 104 to be extensible (e.g., checkpoints can be added and re-used to fulfill new requirements). The Scheduler 104 also allows thread control, provides persistence for business logic, and mitigates risks associated with synchronization of data structures and/or resources.

Figure 6:
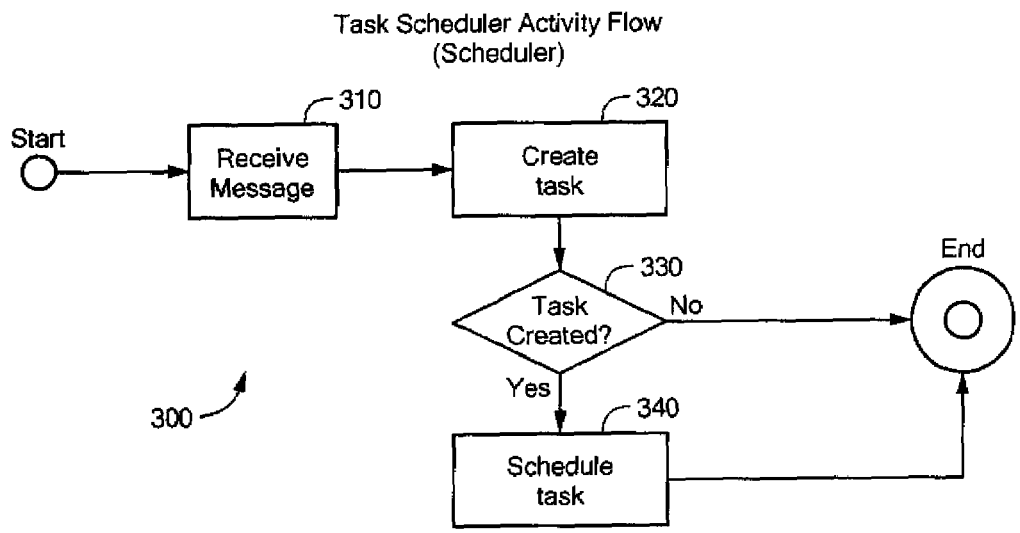
FIG. 6 is a flow chart of scheduler activity flow for the Task Scheduler of FIGS. 2 and 3.
Figure 9:
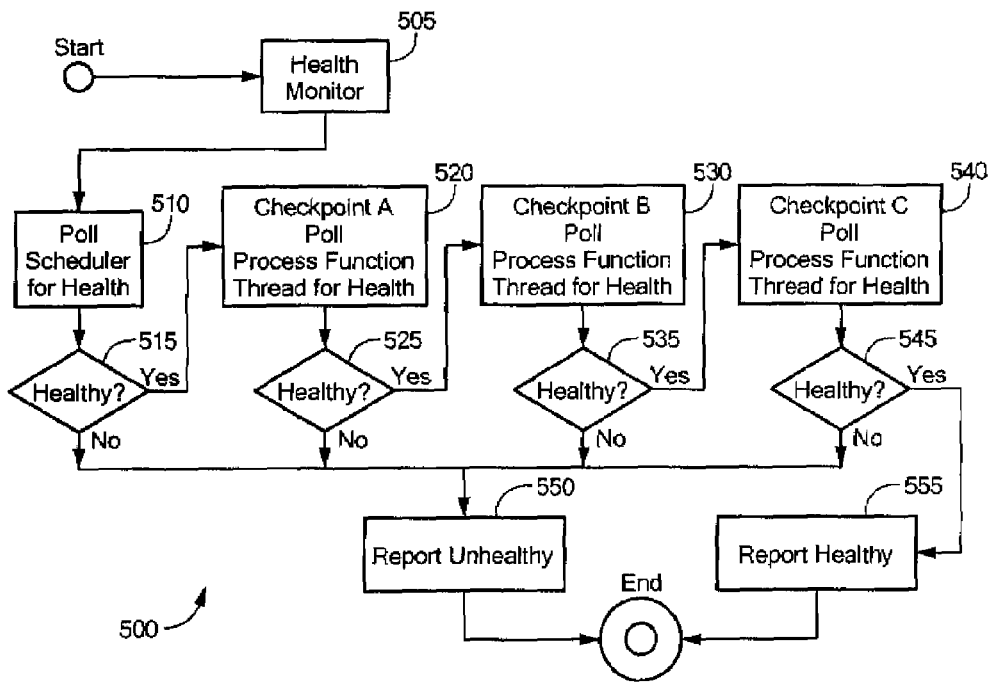
FIG. 9 is a first flow chart of health activity flow for the Task Scheduler of FIGS. 2 and 3.

FIG. 6 is a scheduler activity flow chart 300 for the Task Scheduler of FIG. 3, depicting task creation actions that take place in the scheduling zone 204 of FIG. 3. Referring to FIGS. 3 and 9, a message is received at the scheduler 213 (block 310), such as via the start thread 260 of FIG. 16, and a task is created (block 320). If the task was not created (block 330), then processing ends. If the task was created (block 330, then the task is scheduled (block 340). One reason that the scheduler activity flow chart 200 checks whether a task was created after the "create task" block is to provide a "safety" check for conditions such as if the data provided by the TSCE-I 102 were corrupted for some reason, which condition could cause the task creation to fail.

Figure 7:
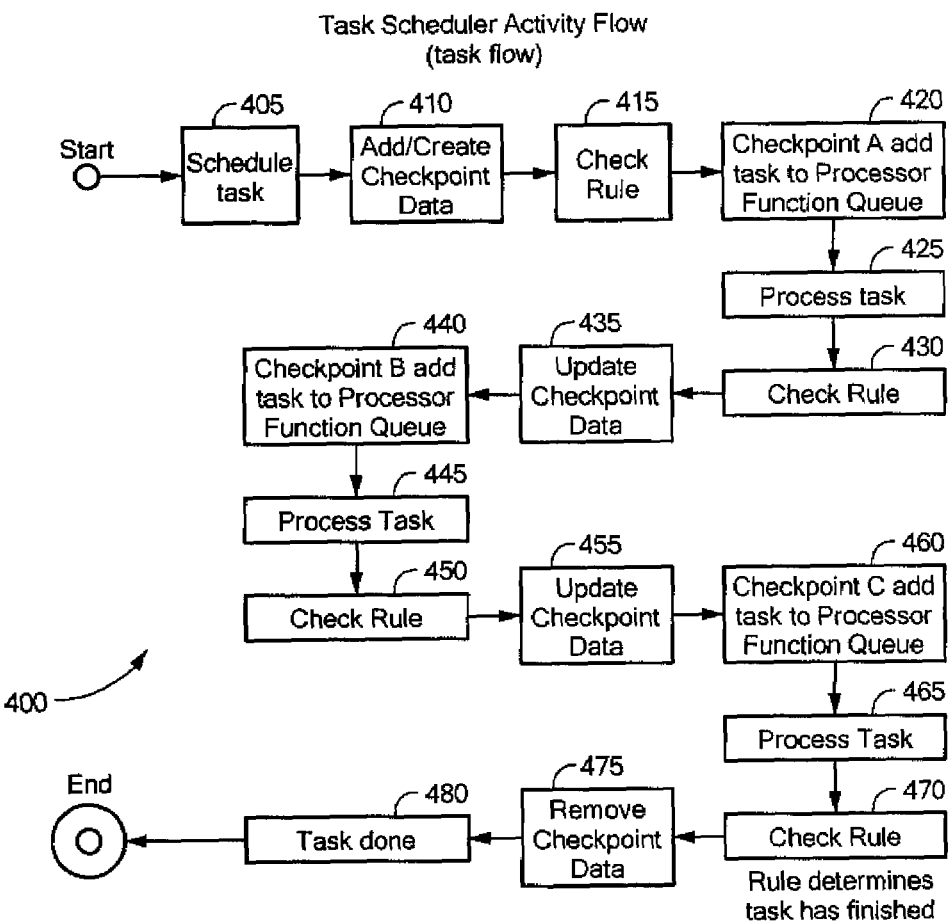
FIG. 7 is a flow chart of task activity flow for the Task Scheduler of FIGS. 2 and 3.
Figure 15:
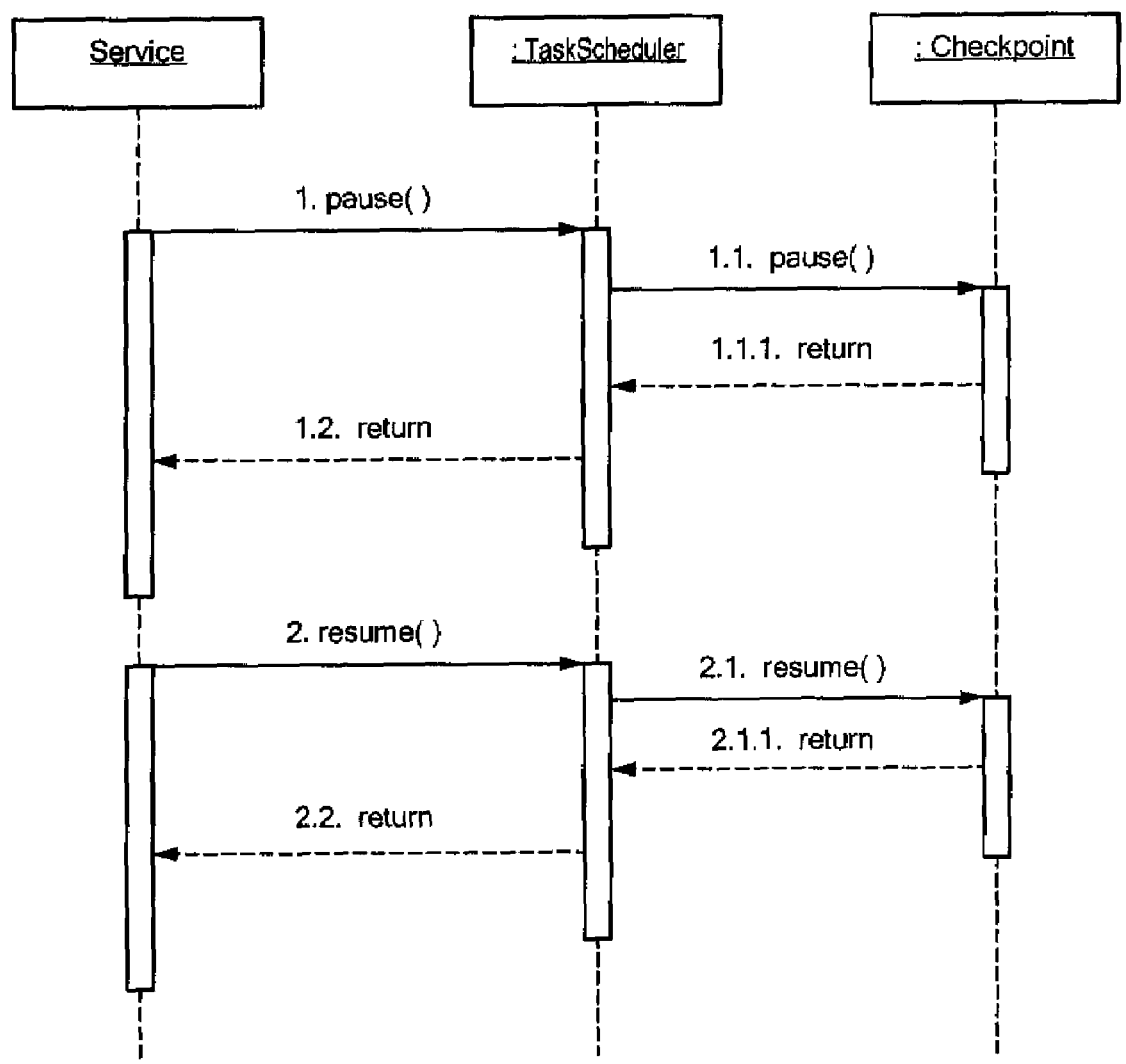
FIG. 15 is a sequence diagram for pause/resume processing for the system of FIGS. 2 and 3.

FIG. 7 is task activity flow chart 400 for the Task Scheduler of FIG. 3, depicting task scheduling actions that occur in the scheduling zone 204 of FIG. 15. Referring to FIGS. 3, and 7, the scheduler 212 schedules a task (block 405) and adds and/or creates checkpoint data for the task (block 410), which in the example of FIG. 3 is the creation of Checkpoint A. The scheduler 212 then checks whether one or more rules are applicable to the task (block 415). Next, at Checkpoint A, the scheduler 212 adds the task to the processor function queue 216A (block 420 in FIG. 7 and thread 261 in FIG. 3). The processor function queue 216A processes the task (block 425). In one embodiment, the queue of tasks waiting for a given processor function are processed as shown in FIG. 8, which is an illustration of the operation of the processor function queues 216A, 216B, AND 216C.

Figure 8:
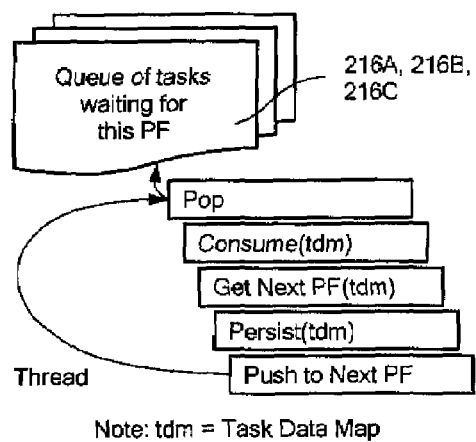
FIG. 8 is an illustration of the operation of the processor function queues of the system of FIGS. 2 and 3.

Referring briefly to FIGS. 3, 7, and 8, in the queue 216A, the highest priority task is popped (i.e., released for processing), and consumed (i.e., executed, see block 425 in FIG. 7 and thread 252 in FIG. 3). The rule is checked (block 430), so that the next processor function (PF) can be retrieved (thread 254 in FIG. 15). Before beginning processing of the next processor function, the data is persisted (i.e., the checkpoint data, in this case at checkpoint B, is updated) (block 435 in FIG. 7 and thread 268 in FIG. 3). The checkpoint data provides a TaskDataMap for persistent data used across processor functions. This data is stored at the beginning of the task request and at the end of each subsequent processor function, and checkpoint data is removed at the end of the last processor function. Because the checkpoint data is stored in persistent storage 214, it can be used to restore a task and/or put the task back into the appropriate queue, should there be a need to recover the data and/or the application running the data.

At checkpoint B, the thread pushes down to point to the next highest processor function in the queue (block 440). Then, the processes are repeated (blocks 445-435 of FIG. 7) until the rule determines that the task has finished (block 470). When the task is finished, the checkpoint data is removed (block 475 in FIG. 7 and thread 264 in FIG. 3), and the task is ended.

In at least some embodiments of the invention, a user can control the checkpointing functions after processor functions have been executed. For example, a user can choose to skip the step of persisting the current checkpoint data, and choose to recover instead from the last saved checkpoint. This can be useful in instances where a user has determined that some or all of the current processing has problems and/or errors, or if a user wants to terminate a possibly malfunctioning thread.

Figure 10:
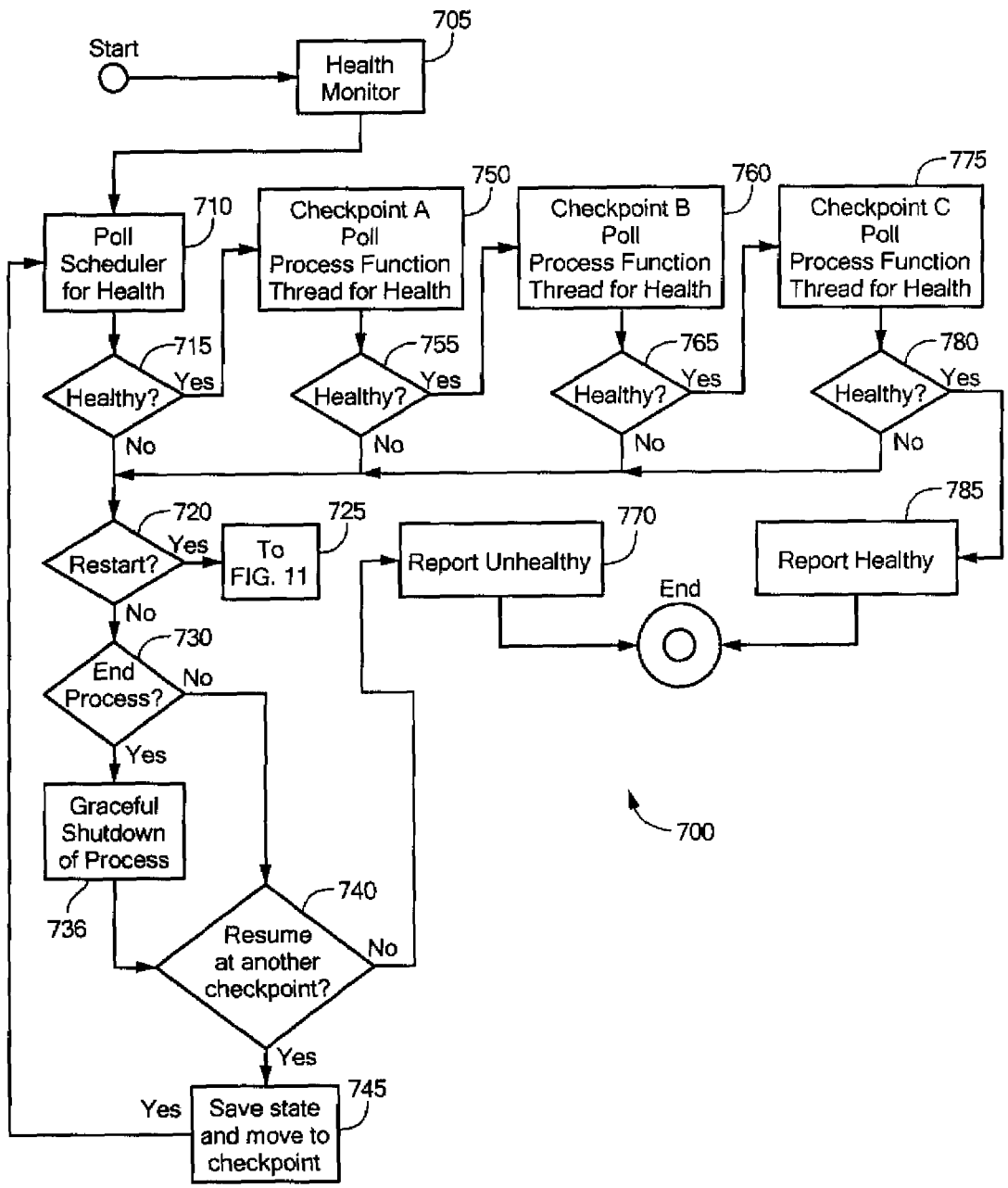
FIG. 10 is a second flow chart of health activity flow for the Task Scheduler of FIGS. 2 and 3.

FIG. 9 is a first health activity flowchart 500 for the Task Scheduler of FIG. 3, for a first illustrative example of health monitoring occurs that in at least one embodiment of the invention. The health activity processing that occurs in this flowchart 500 can provide notifications as to how well a task is progressing, how far it has gone, etc. For example, if the task involves sending a document to a printer and printing it, the user can receive notifications about the progress of the task and error notifications if a problem exists. A checkpoint could, for example, be a printed page, where the checkpoint is on its own thread. When printing a document, a user may receive a first message when the document has been sent to a printer, a second message when the document has begun printing, one or more additional messages telling the user what page the printer is on, and a final message to tell the user the printing task is complete. If an error occurs during any of these states, the user is notified and, in at least some instances, whatever processing of the task that is occurring will stop. Alternately, as shown in FIG. 10 (described further below), if a single checkpoint (e.g., a single page or a single print job) fails, the processing can shut down, attempt to restart, attempt to recover, or move on to another page or print job)

Unlike conventional printing queue tasks, however, with the invention it is possible to recover failed tasks more easily, permit other tasks to go ahead even if one has failed or has not executed correctly, and monitor thread, task, and checkpoint "health" and notifications of problems more generic and applicable to many different systems and configurations, versus the very specific printer queue processing that can occur with certain specific types of printers.

Referring again to FIGS. 3 and 9, the processing for this flowchart takes place in the health zone 202 and the scheduling zone 204 of FIG. 15. The health monitor 210 is started (block 505), and it polls the scheduler 212 for health information (block 510). If the scheduler 212 tells the health monitor that it has a problem (i.e., is not "healthy") (block 515), then the health monitor reports that the component currently being polled (in this case, the scheduler 212) is unhealthy (block 550) and the health monitor continues polling. The health monitor continues polling because the TaskScheduler may be able to recover from the problem. If the TaskScheduler reports a problem as serious as a catastrophic error, the health monitor stops polling and reports a problem that causes the SCI 107 to be shutdown, and the recovery mechanism gets activated as a slave SCI take over from the master SCI.

If the polling of the scheduler 212 shows that it is healthy, then the health monitor polls the first checkpoint (i.e., checkpoint A) (block 520). If the first checkpoint is unhealthy (block 525), then the health monitor reports that the component currently being polled (in this case, checkpoint A) is unhealthy (block 550) and the health monitor stops polling. Similar polling and notifications occur for checkpoints B and C. The task scheduler reports a rollup of all thread health. If a single thread is unhealthy the task scheduler reports a minor error and tries to recover the thread. If unsuccessful in recovering the thread it can shutdown the offending thread and start a new one.

Figure 11:
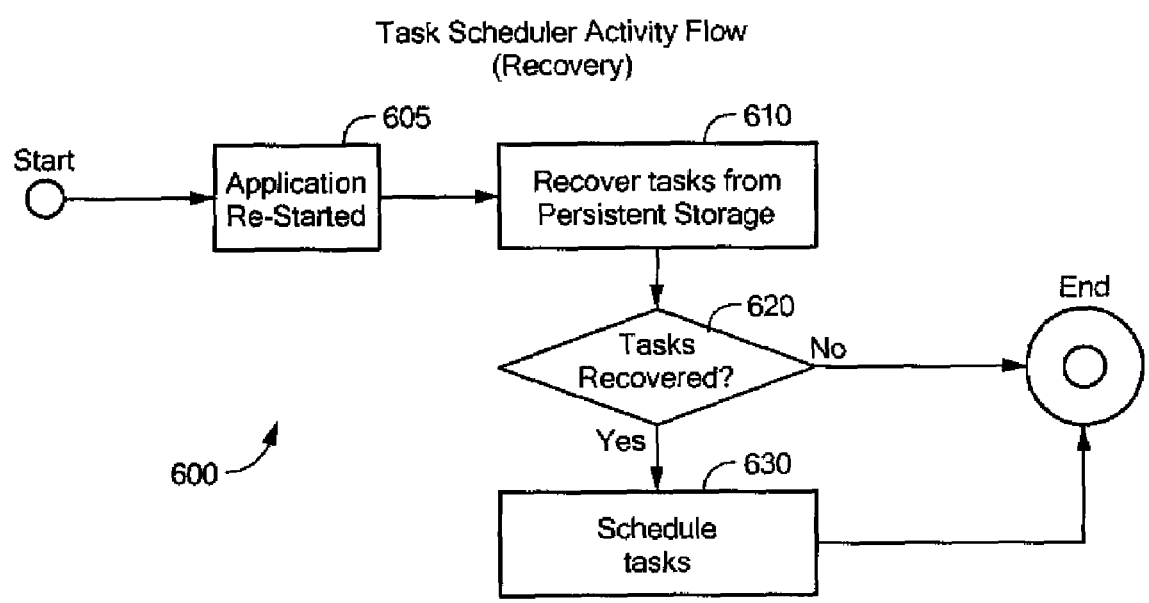
FIG. 11 is a flow chart of recovery activity flow for the Task Scheduler of FIGS. 2 and 3

Should the health monitor processing of FIG. 9 find that the scheduler or one of the checkpoints is not healthy, recovery is possible. FIG. 11 is a recovery activity flow chart for the Task Scheduler of FIG. 15. Recovery processing takes place in the recovery/persistence zone 208, the application zone 206, and the scheduling zone of FIG. 3. Referring to FIGS. 3 and 11, the application that is being recovered is restarted (block 605). In one embodiment, a failed task will necessitate a failed thread, which necessitates a failed SCI, but this is not necessarily true for all embodiments of the invention. For example, in one embodiment, the task scheduler could recover a failed task and ultimately shutdown a failed thread and re-start it with the failed task. In another embodiment, if a task fails 3 times then the scheduler could log a problem to the user and start the next task on the queue. Of course, these are only illustrative examples and other modes of recovery are possible. Tasks associated with the failed application are recovered from persistent storage (block 610). If the tasks cannot be recovered (block 620), then recovery processing ends, which could mean, for example, that recovery has failed or even that the process has just started and there are not yet any tasks to recover. If the tasks are recovered, then they are scheduled (block 630), and the task flow proceeds in the same manner described previously for other scheduled tasks.

FIG. 10 is a second health activity flowchart 700 for the Task Scheduler of FIG. 3, for a second illustrative example of health monitoring that occurs in at least one embodiment of the invention. The operation of FIG. 10 is similar in several ways to the operation of FIG. 9, except that the processing differs if the answer to the "healthy" query is "No" (i.e., blocks, 715, 755, 765, and/or 780).

Referring to FIGS. 3 and 10, in block 715, if the poll of the scheduler for health (block 710) finds that the scheduler is not healthy, then processing proceeds in accordance with one or more predetermined rules. For simplification of explanation, in the example of FIG. 10, it is assumed that the logic governing the operation of the scheduler 180 and each checkpoint 136 is the same and is as follows:

If the "healthy" poll result (blocks 715, 755, 765, 780) comes back with the answer "No" for unhealthy, first determine whether the rule for the scheduler 180 and/or the checkpoint 136 wants an attempt at restart to be made (block 720). If the answer is "Yes," then processing proceeds to the recovery flow chart 600 of FIG. 11. If the answer is "No," then processing proceeds to the query block 730. In query block 730, a determination is made as to whether the rule for the scheduler 180 and/or the checkpoint 136 wants the process to end/be shut down. If the answer at query block 730 is "Yes" then a "graceful shutdown" occurs (such as with saving states/files where appropriate, as is known to those of skill in the art) (block 735) and processing proceeds to block 740, to see what to do next. If the answer at query block 730 is a "No" (that is, the process should not be shut down), then processing moves to query block 740.

At query block 740, a determination is made as to whether the rule for the scheduler 180 and/or the checkpoint 136 wants an attempt to be made to begin processing at another checkpoint. If the answer at block 740 is Yes, then the state of the unhealthy process is saved, the processing begins/resumes at a different checkpoint (block 745), and the polling for health resumes (block 710). If the answer at block 740 is "No", then the given scheduler/checkpoint is reported as unhealthy (block 770) in the same manner as done in FIG. 9.

An illustrative example of an embodiment of the invention utilizing the above tasking queue design is now described. This embodiment includes illustrative examples of class diagrams and sequence diagrams for operations associated with the above-described tasking queue, checkpoints, rules, threads, etc. Of course, those of skill in the art will appreciate that the particular class and sequence diagrams provided herein, including the names used and order listed, are proved by way of example and are not limiting.

Figure 12A:
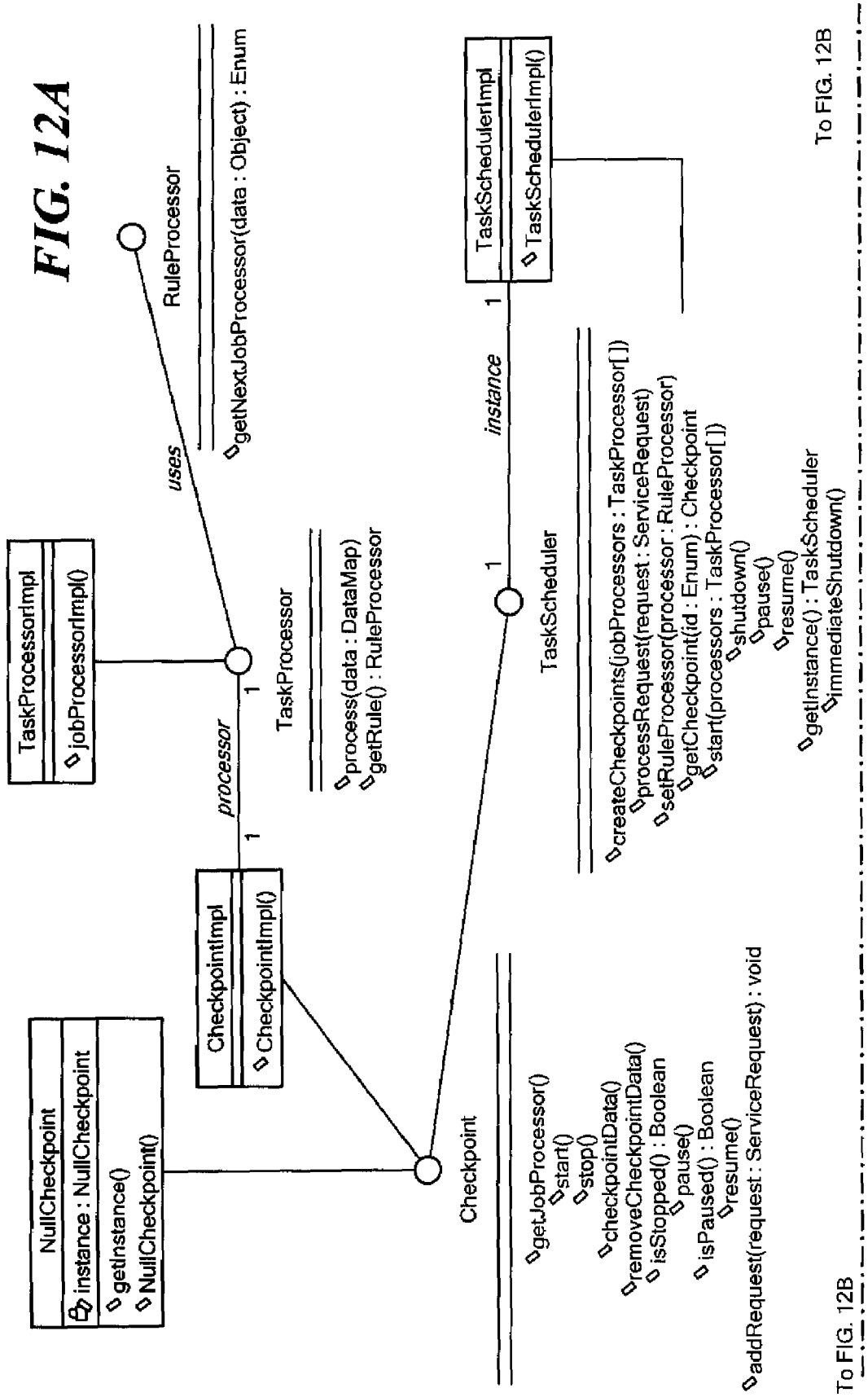
FIGS. 12A and 12B together form a class diagram for the TaskScheduler used with the system of FIGS. 2 and 3, in accordance with one embodiment of the invention.
Figure 12B:
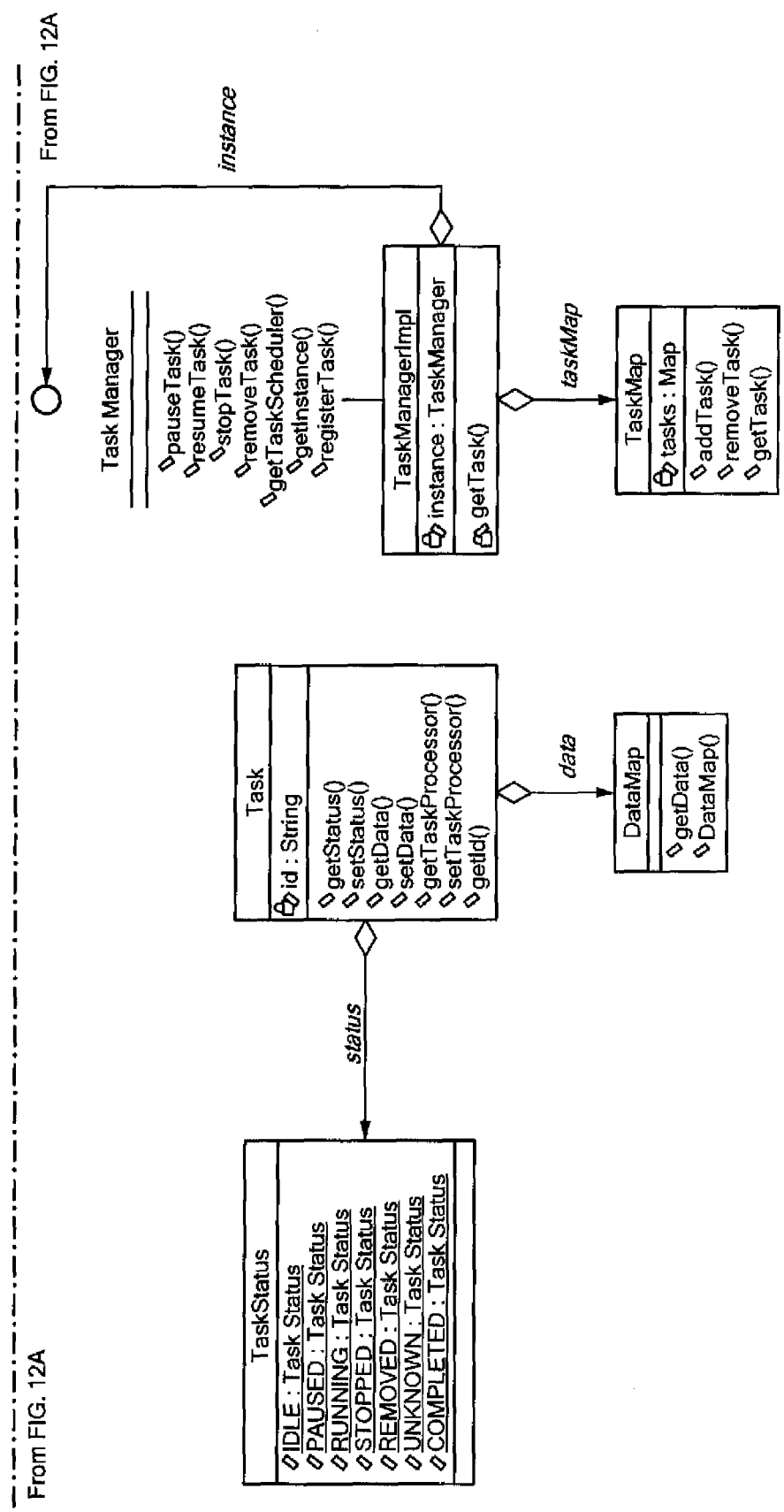

In this example, a class called TaskScheduler is used to implement the tasking queue 128 of FIGS. 2 and 3. FIGS. 12A and 12B together form a TaskScheduler class diagram 200 for the system and scheduler 104 of FIGS. 2 and 3, in accordance with one embodiment of the invention. The TaskScheduler class diagram 200 is a high-level class diagram showing the interdependency of objects and -interfaces.

Advantageously, in one embodiment, the design of the TaskScheduler utilizes services provided by a Systems-of-Systems Common Operating Environment (SOSCOE). SOSCOE is a system used by the U.S. military that delivers a reusable set of software components that platform integrators and application developers use as the foundational building blocks of their software code. SOSCOE helps battlefield systems communicate and interact with other systems, such as the U.S. Army's Future Combat Systems (FCS)-equipped Unit of Action (UA).

The Database SOSCOE service is used for persisting Checkpoint state data. This data is used for recovery/failover. Every Checkpoint's state data is persisted before the previous thread's control is relinquished, which helps to make the scheduler more deterministic. Once the last Checkpoint's execution is finished the state data is removed.

The Pub/Sub SOSCOE service is used as an external stimulus. Any message can be passed through this framework for processing, so long as a TaskProcessor has been implemented to handle that data entity. Pub/Sub is a standard way for incoming messages to be received and sent.

The Event SOSCOE mechanism can be used to send messages for processing into the TaskScheduling framework, notify a manager/entity that a particular TaskProcessor has completed, been entered, or has an issue, etc.

Of course, as those of skill in the art will appreciate, use of SOSCOE services and mechanisms is not required for any embodiments of the invention. The embodiments of the invention that include use of outside services can be used with reusable software components or services provided by any entity, independent of whether the entity is a military-based entity.

Referring again to FIG. 12, the TaskScheduler is a class that is responsible for the scheduling and creation of checkpoints. When a message is given (e.g., received at scheduler 104) for processing, it is the TaskScheduler that ensures that the message data is forwarded to the correct checkpoint and that higher priority messages are handled appropriately. An important purpose of the TaskScheduler is to link several so-called "atomic" tasks together to perform a larger operation. These atomic tasks, referred to herein as TaskProcessors, can be derived from a large task, broken at functional locations and linked together with specific rules, which are referred to herein as RuleProcessors. By doing this, a system (e.g., scheduler 104 of FIGS. 2 AND 3) can have several tasks use some of the same TaskProcessors, but link to others, possibly in differing order, simply by configuring the RuleProcessors accordingly. These rules define the order and which TaskProcessors are visited during the execution of a complete task.

The TaskProcessor is a functional business logic component. This class is responsible for managing an isolated portion of business logic used in processing the given data. A particular task/data element may require multiple actions to be taken, each of which can be done in isolation, and are data independent. Each of these actions can be modeled as TaskProcessors with a RuleProcessor specifying what the next action to take, based on the data present. Particular implementations of the Task Processor are user dependent.

The Checkpoint (also referred to herein as a processor function) is a container for a TaskProcessor and provides it the framework needed to integrate into the scheduling system. In addition, the Checkpoint provides the means for task threading, queuing, persisting, and recovery.

A RuleProcessor dictates which TaskProcessor is necessary to continue the processing of the given data. The determination can be static, non-dynamic, and/or based on state, data. Particular implementations of the RuleProcessor are user dependent. The Rule Processor encapsulates the configurability of the scheduling framework. The rules are provided by the SCI business logic 106.

The RuleProcessor and TaskProcessor (described further herein) provide flexibility to the TaskScheduler framework. A RuleProcessor can dictate the direction of processing flow, order of TaskProcessors, by data state, as shown in FIG. 5B, which includes a TaskScheduler State Diagram 160B. In FIG. 5B, each checkpoint 136A-136A is a "container" for a respective TaskProcessor that performs specific business tasks on the data presented them, while RuleProcessors, the links between the TaskProcessors, dictate which path to take based on the current state of the given data. Each TaskProcessor has its own corresponding RuleProcessor to determine what business logic component to use next in processing. For example, by utilizing RuleProcessors, the same four TaskProcessors can be used for many different messages and contexts. As illustrated in FIG. 4, each TaskProcessor (represented in FIG. 4 by the Tasks) performs tasks on a separate queue and separate thread. This allows tasks to be processed independently and concurrently.

In a further embodiment of the invention, the TaskProcessors are dynamically swapped and/or loaded. Different task processors can be loaded or swapped based on a predetermined usage algorithm. For example, if several TaskProcessors have not been used within a predetermined time period (e.g., 10 minutes) the TaskProcessors are removed until their use becomes necessary to free heap space. Another use algorithm example is to "lazy load" (also referred to as "on-demand load") one or more Task Processors (i.e., defer the loading of one or more TaskProcessors until they are needed or access to them is requested).

Figure 13:
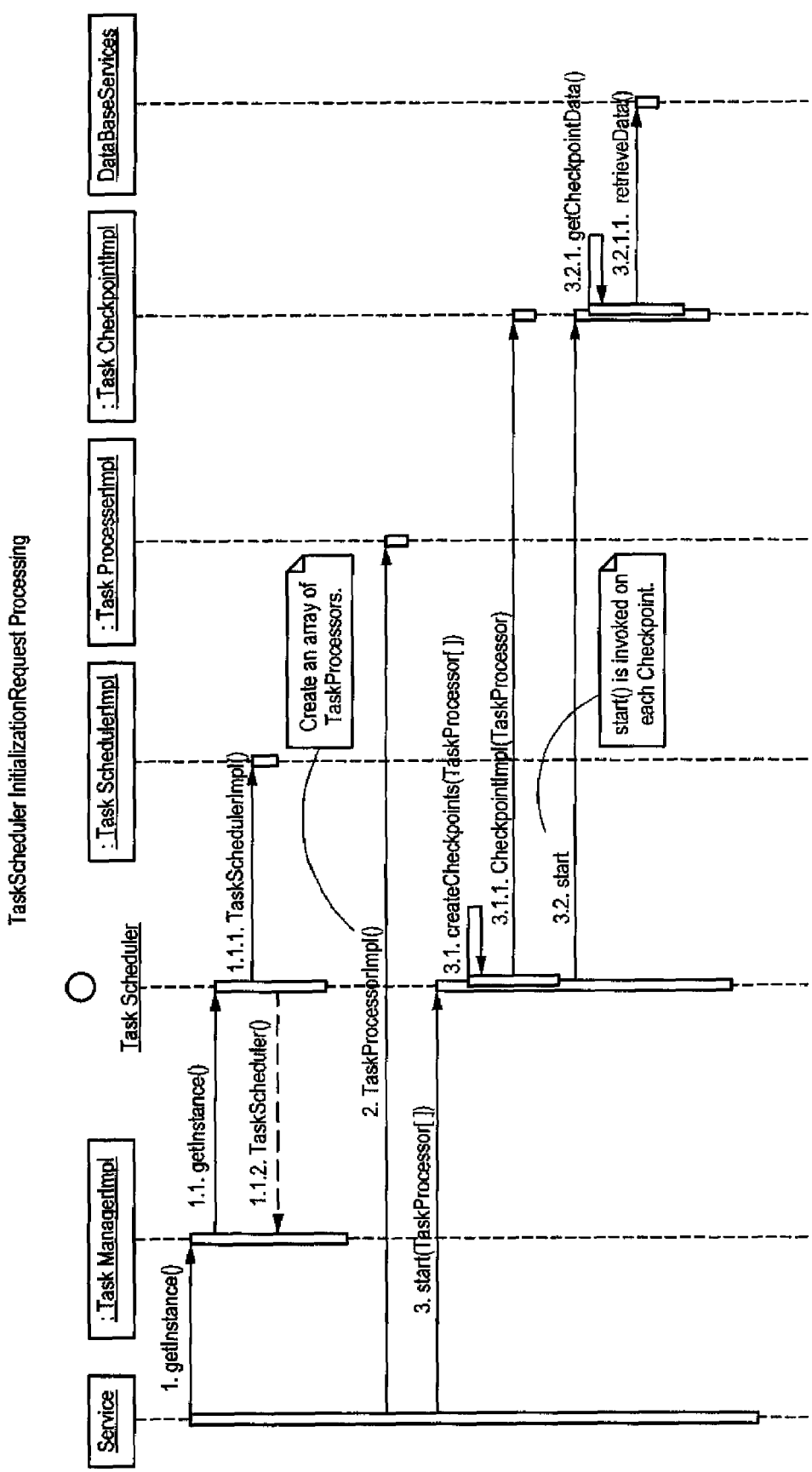
FIG. 13 is a sequence diagram for initialization request processing for the system of FIGS. 2 and 3.

FIG. 13 is a TaskScheduler Initialization sequence diagram for initialization request processing for the TaskScheduler of FIGS. 12A and 12B. The TaskScheduler is initialized by the client at startup, or when appropriate. Starting the TaskScheduler preferably is done after database services have been established so that recovery can be performed. The TaskScheduler Initialization sequence diagram of FIG. 13 depicts the initialization sequence of the TaskScheduler framework.

First, the client, the GenericService in this diagram, invokes the constructor of the TaskSchedulerImpl (step 1), thereby instantiating the TaskMap (step 1.1), which maintains the association of Task to Id within the manager, and the TaskScheduler (step 1.2). After creating and populating an array of TaskProcessors (step 2), the client hands those TaskProcessors to the TaskScheduler associated with the TaskManager via the initialize( ) method (steps 3 through 3.1.1). The start( ) method for the TaskScheduler is invoked upon each Checkpoint (step 3.2) and the TaskProcessor array is passed through. This creates the list of Checkpoints to be managed, one created for each TaskProcessor (step 3.2.1). Upon doing so the start( ) method of each Checkpoint is called (step 3.2.2). This will result in data recovery for each Checkpoint; setting each Checkpoint to the state they were in prior to the last shutdown (step 3.2.2.1). After all of the Checkpoints have completed recovery the TaskScheduler is able to receive client Messages.

Figure 14:
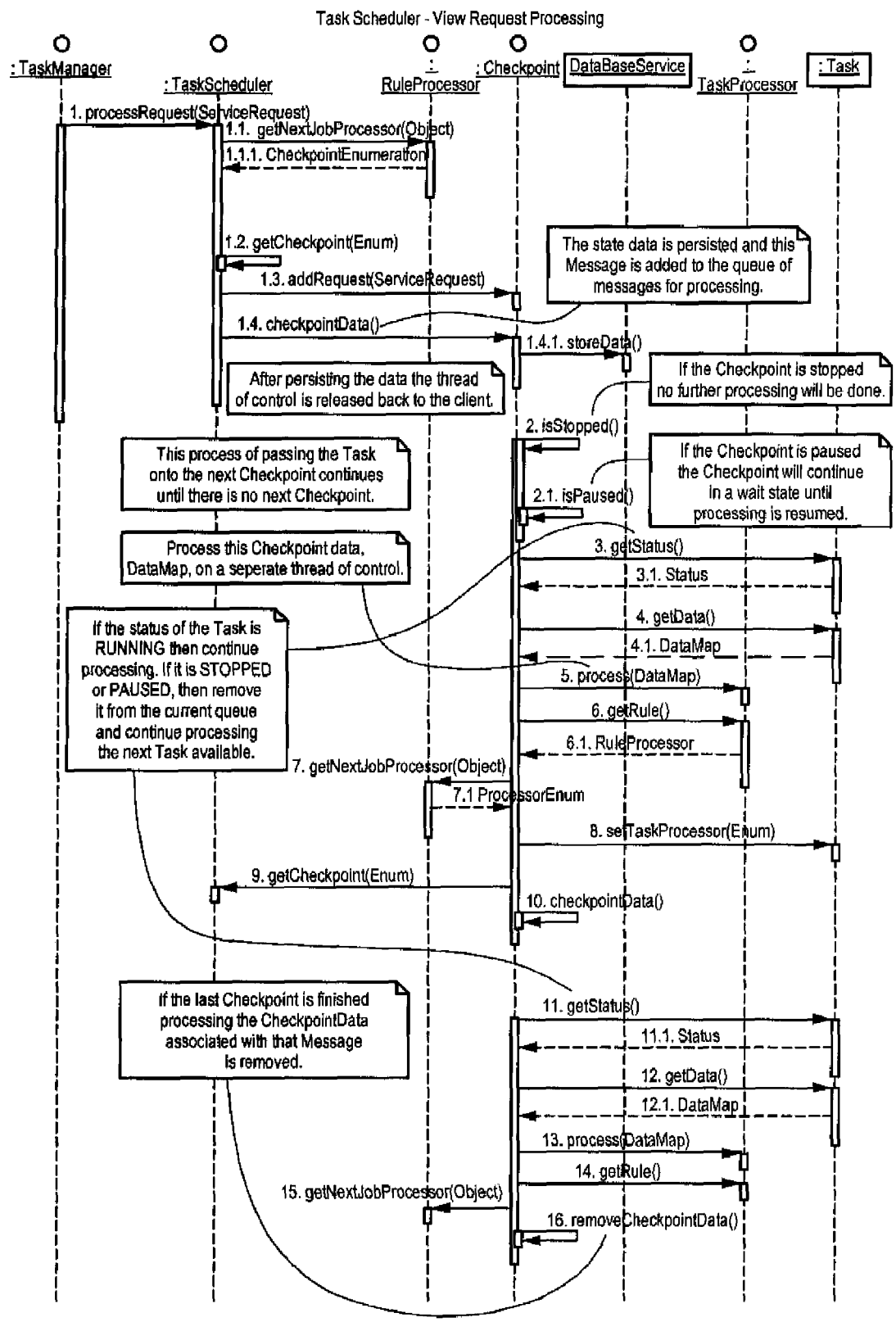
FIG. 14 is a sequence diagram for TaskScheduler view request processing, for the system of FIGS. 2 and 3.

FIG. 14 is a sequence diagram for Taskscheduler view request processing, for the system of FIGS. 2 and 3. FIG. 14 depicts how the TaskScheduling framework handles the processing of a ServiceRequest from a client.

Referring to FIG. 14, the TaskScheduler begins processing the Task by requesting the ID of the first Checkpoint used in processing of the given Task from its member RuleProcessor, if one is not provided (steps 1 through 1.3). After retrieving this Checkpoint, the state data for this Checkpoint is persisted (steps 1.4 and 1.4.1). This is done for recovery purposes. If the message is dropped before being persisted, it is the client's responsibility to ensure the re-delivery of the message. However, after a successful delivery the TaskScheduler must ensure the message is successfully and correctly processed. After the state data is persisted, the thread of control is relinquished back to the client and further processing will be managed by the threads owned by the TaskScheduler.

After the state data is persisted the Message of interest is placed on the queue of the current Checkpoint (step 1.3). Subsequent processing within that Checkpoint will be done on that thread, thereby allowing for "concurrent" processing of Messages. The state data, named TaskData, is handed off to the current Checkpoint's TaskProcessor (step 5), which controls the business logic used in processing this Task. Upon the TaskProcessor's completion the RuleProcessor for the current Checkpoint is requested (step 6). The RuleProcessor is queried for the next Checkpoint needed to complete the processing of this task (step 6). The RuleProcessor returns the ID of the next Checkpoint (step 7.1), that Checkpoint ID is set in the Task for facilitating recovery and Task scheduling (step 8). The next Checkpoint is retrieved from the TaskScheduler (step 9), and the new state data for the next Checkpoint is persisted, which also places the current Task on the next Checkpoint's processing queue. The above process continues (e.g., steps 10-15) until there is not another Checkpoint needed for processing. When all Checkpoints required for processing the current Task have been visited the state data associated with this Task is deleted from the persistent storage (step 16).

FIG. 15 is a sequence diagram for pause/resume processing for the TaskScheduler of FIGS. 12A and 12B. When the client invokes the pause( ) method (step 1) the TaskScheduler will pause each of the managed Checkpoints (steps 1.1 and 1.1.1). Each Checkpoint examines its status before processing a message. By invoking pause( ) on the Checkpoint, the status is changed to paused, so that full processing is given to the higher priority task(s). Once the TaskProcessor completes processing, the Checkpoint optionally persists its state data and its thread of execution is put into a waiting state. Note that, if desired, a user can save state data before a pause in processing, although in many instances this is not necessary because the last known and saved checkpoint is often "good enough" for recovery purposes. The Checkpoint remains in this wait state until either the Checkpoint is stopped or resumed. Once resumed (steps 2 through 2.2), the Checkpoint is taken out of the paused state and the next ServiceRequest is taken off of the queue and handed to the Task Processor.

Figure 16:
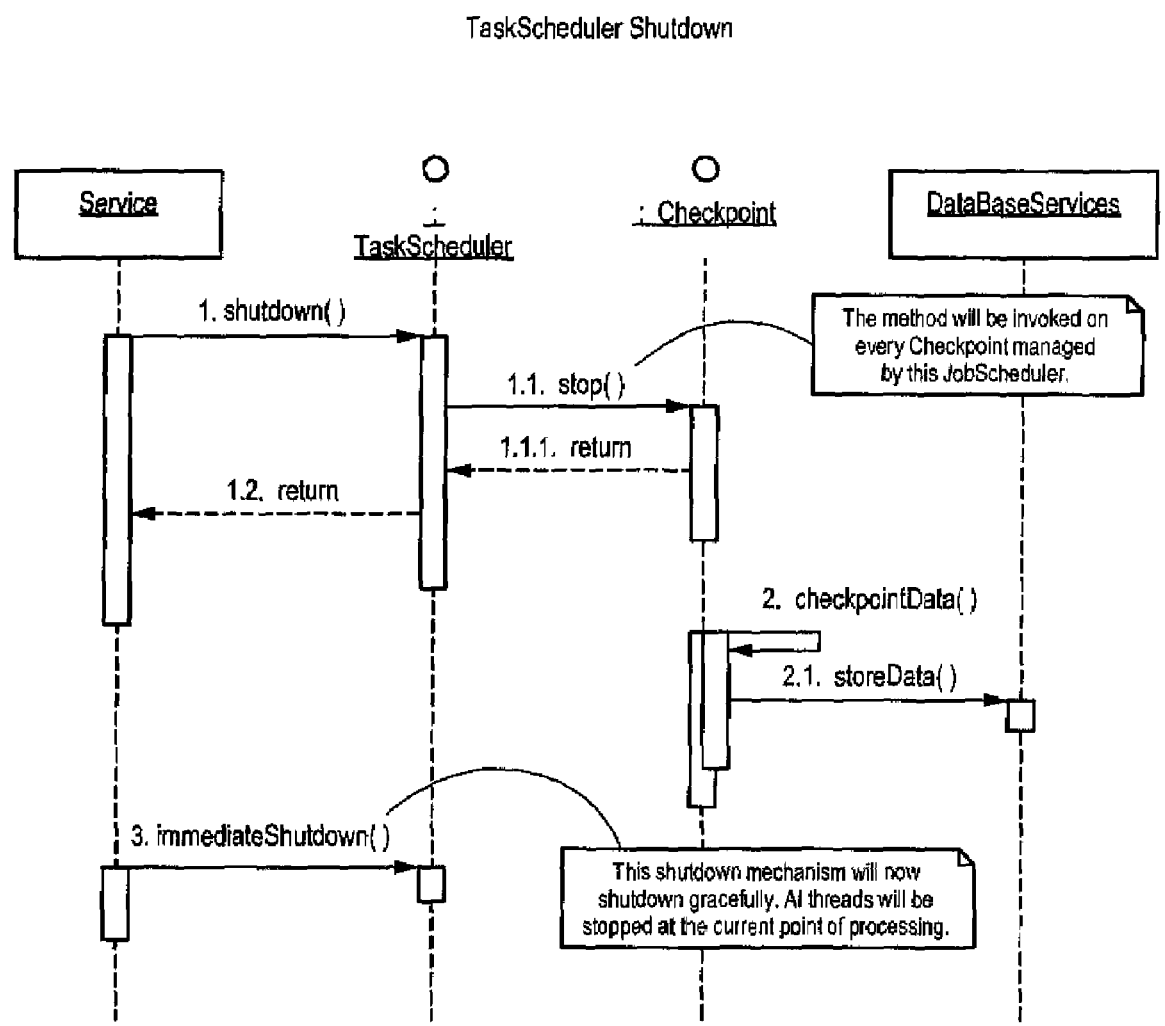
FIG. 16 is a sequence diagram for shutdown processing for the system of FIGS. 2 and 3.

FIG. 16 is a sequence diagram for shutdown processing for the TaskScheduler of FIGS. 12A and 12B. When the client invokes the shutdown( ) method (step 1) the TaskScheduler will stop each of the managed Checkpoints (steps 1.1 through 1.2). Each Checkpoint examines its status before processing a Task. By invoking stop( ) on the Checkpoint the status is changed to stopped. Once the TaskProcessor completes processing the Checkpoint persists its state data (steps 2 and 2.1) and its thread of execution is terminated (step 3). By invoking immediateShutdown( ) the current processing of a Task is interrupted and the Checkpoint is forced to terminate. This results in non-deterministic behavior but ensures that termination completes rapidly and that no further processing goes to completion (which results from waiting for a Checkpoint to finish processing the current Task).

In one embodiment of the invention, to track the progress of a task, specific messages are published during the lifecycle of that task. This is similar to the way the health monitor polls and then provides a notification, as described further herein. Those messages are captured and interpreted by a tracking service. The publishing of messages is done in one or more ways in the various embodiments of the invention:

1. Send a message within the TaskProcessor, giving specific information regarding the progress made within that business logic.
2. Subclass off of a parent TaskProcessor that is designed to send a message at a predefined point during processing. This message need not be specific, and could be vague and/or general but is done automatically by the framework.
3. Send a message within the Checkpoint. This message is not intended to be task-specific, as every Checkpoint is the same—simply a container for the user-defined TaskProcessor, but the message within the Checkpoint is done automatically by the framework.

One benefit of the system and scheduler 104 of FIGS. 2 and 3 and as further described herein is that the task can be broken in as many or few TaskProcessor units as necessary. Other benefits of at least some embodiments of the invention include:

(a) Request Queuing/Multi-Threading, which allows the client to post a non-blocking request of service.

(b) Request Pause/Stop, which allows Clients to pause or stop a particular ServiceRequest without affecting the other requests being serviced by the scheduler.

(c) TaskProcessor Independence, where each TaskProcessor has visibility to its necessary business logic components. Those functional blocks know how to process a particular data set, thus facilitating the interchanging of processors to accomplish several different tasks.

(d) User Contributed TaskProcessors and RuleProcessors, which allow the user to implement specific rule logic this framework has scalability. In addition, this framework is designed to be generic enough to be used in varying environments.

(d) Persistence and Recovery, where the Checkpoint manages state persistence before handing the ServiceRequest to the next Checkpoint, ensuring recovery to the current Checkpoint. In addition to managing persistence, the Checkpoint recovers its previous state during initialization.

As seen in the above figures, the TaskScheduler has a procedure to handle the pausing, resuming, and stopping of a ServiceRequest described above. Certain services may require that specific actions take place before a request be paused, stopped, or resumed. In at least some embodiments of the invention, the requirement that specific actions take place before a request is paused, stopped, or resumed is handled in one of the two following ways.

1. TaskProcessors are created to handle the PAUSED and STOPPED ServiceRequests. When a request enters either of these states, the current TaskProcessor's RuleProcessor directs the Checkpoint to forward the request to the appropriate TaskProcessor. These processors ensure that the ServiceRequests are safely paused or stopped. In addition, the Checkpoint responsible for the PAUSED requests periodically polls its queue to ensure that any request whose state has changed is forwarded to the correct TaskProcessor.

2. Additional methods are added to the TaskProcessor interface that delegate the implementation of pausing, stopping, and resuming local to the current processor. Each Checkpoint still checks for a valid state before processing a request, but before forwarding a PAUSED or STOPPED request the Checkpoint safely resolves the requests state.

In accordance with one embodiment of the invention, another approach to the RuleProcessor utilization described above involves associating a rule to each type of ServiceRequest handled by each service. This rule dictates the order of TaskProcessors to complete the request (synonymously to the RuleProcessor), but is tailored to that request, rather than having a RuleProcessor tailored to a TaskProcessor. This implements the rule and is equally configurable as the other embodiments, but enables the system and scheduler 104 of FIGS. 2 and 3 to be more static than dynamic, data-driven.

In accordance with another embodiment of the invention, to minimize the thread overhead/utilization (for example, possible operating system (OS) threading issues with 300+ services concurrently running, each with one or more threads) provisions are added that allow processing to be accomplished on the client thread. This is a configurable item, dependent on the service and required capabilities. The services that employ this feature only require a single Checkpoint, no state persistence, and the business logic needed to service a request is minimal. This option and embodiment requires that the need for pausing and shedding of a ServiceRequest be unnecessary for those services.

Using the task scheduler, as described herein, provides a number of benefits for the software development process, including providing a framework for prioritizing processing tasks, enabling application teams to divide up large application processing functions and design concurrently, helping to free up application developers to focus on business logic by relying on the Task Scheduler for persistence, data recovery, threads and thread health, and providing a common/consistent code for handling fail-over needs As the above description provides, at least some embodiments of the invention establish a task scheduling/monitoring approach that accommodates a scalable and configurable architecture, provide a fault recovery strategy, and has provision to allow for decision engine usage. Reuse of the design patterns, as provided in some of the embodiments of the invention, provides a more reliable implementation and improves value to the customer.

The systems and methods of the invention can be adapted to run on a variety of standard COTS computer hardware available from commercial suppliers. It is transportable between systems, with minimal modification, and is expandable to keep place with evolving business and customer requirements. Because at least some embodiments of the invention provides systems and methods for monitoring thread health and correcting itself, the invention is very useful at the application level for many different applications, especially web service applications (e.g., electronic commerce applications).

As those skilled in the art will recognize, the invention described herein can be modified to accommodate and/or comply with any many different technologies and standards. In addition, variations, modifications, and other implementations of what is described herein can occur to those of ordinary skill in the art without departing from the spirit and the scope of the invention as claimed. Further, virtually any aspect of the embodiments of the invention described herein can be implemented using software, hardware, or in a combination of hardware and software.

It should be understood that, in the Figures of this application, in some instances, a plurality of system elements or method steps may be shown as illustrative of a particular system element, and a single system element or method step may be shown as illustrative of a plurality of a particular systems elements or method steps. It should be understood that showing a plurality of a particular element or step is not intended to imply that a system or method implemented in accordance with the invention must comprise more than one of that element or step, nor is it intended by illustrating a single element or step that the invention is limited to embodiments having only a single one of that respective elements or steps. In addition, the total number of elements or steps shown for a particular system element or method is not intended to be limiting; those skilled in the art will recognize that the number of a particular system element or method steps can, in some instances, be selected to accommodate the particular user needs.

It should also be appreciated that the flow diagrams and flow charts provided herein do not depict the syntax of any particular programming language (although in some instances methods from the Java programming language have been provided by way of example). Rather, the flow diagrams and flow charts illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit and scope of the invention.

Further, in describing the embodiments of the invention illustrated in the figures, specific terminology is used for the sake of clarity. However, the invention is not limited to the specific terms so selected, and each specific term at least includes all technical and functional equivalents that operate in a similar manner to accomplish a similar purpose.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed.

The invention claimed is:

1. A computer-implemented method for performing a process, the method comprising:
   (a) receiving a request to perform a process, the process having a state and comprising a plurality of tasks and at least a scheduler rule;
   (b) receiving a plurality of checkpoints associated with the process, each checkpoint comprising checkpoint state data and at least a respective checkpoint rule governing execution of the process, wherein the checkpoint state data comprises information about the state of the process and wherein the checkpoint rule defines, based at least in part on at least one of the checkpoint state data and a first predetermined condition, one or more of the plurality of tasks to be executed and the way in which the one or more tasks will execute;
   (c) determining a first task of the plurality of tasks to be scheduled into a priority queue, in accordance with the scheduler rule;
   (d) determining the first checkpoint of the plurality of checkpoints that is to be the first checkpoint used in processing the first task, in accordance with the scheduler rule;
   (e) creating the checkpoint state data for the first checkpoint; and
   (f) saving the checkpoint state data for the first checkpoint.

2. The method of claim 1, wherein the first predetermined condition comprises receiving an instruction to process the tasks in a specific order.

3. The method of claim 2, wherein the specific order deviates from the order specified in at least one of the scheduler and checkpoint rules.

4. The method of claim 1, wherein the first predetermined condition comprises receiving a second request to perform a process, where the second request has a higher priority than the first request.

5. The method of claim 1 wherein the first predetermined condition comprises determining that a task has not been scheduled properly.

6. The method of claim 1, wherein the first predetermined condition comprises determining that a task has not been processed correctly.

7. The method of claim 1, wherein the first predetermined condition comprises determining that a task is unhealthy.

8. The method of claim 7 further comprising providing a notification if a task is unhealthy.

9. The method of claim 7, further comprising attempting to perform at least one of the following actions if a task is unhealthy:
   (i) restarting the task;
   (ii) ending the task; and
   (iii) moving processing to a different task.

10. The method of claim 7 further comprising:
    (k) retrieving a stored checkpoint associated with the task that did not process correctly;
    (l) recovering the failed task using the retrieved checkpoint; and
    (m) repeating steps (d) through (f).

11. The method of claim 1, further comprising polling during at least one of steps (a) through (f) to determine whether processing of a task occurred correctly.

12. The method of claim 1, wherein each checkpoint is allocated a respective thread and a priority queue, and the method further comprises polling each thread to determine whether the thread is healthy.

13. The method of claim 12, further comprising reporting when a task has been processed.

14. The method of claim 13, further comprising determining, based on when a task has been processed, how long it takes for a given task to be performed.

15. The method of claim 12 further comprising attempting to perform at least one of the following actions if a thread is unhealthy:
    (i) restarting the task on a new thread;
    (ii) ending the task; and
    (iii) moving processing to a different task.

16. The method of claim 1, wherein the first predetermined condition comprises receiving an instruction to pause or stop the performing of the process.

17. The method of claim 1, further comprising sending a notification providing information regarding the progress made in performing the process.

18. The computer-implemented method of claim 1, further comprising:
    (g) processing the first task in accordance with the checkpoint rule associated with the first checkpoint;
    (h) determining the next task in the plurality of tasks to perform, based on the checkpoint rule associated with the first checkpoint
    (i) updating the saved checkpoint data for the first checkpoint with the data and state associated with the first task and storing the updated saved checkpoint data in the memory;
    (j) repeating steps (c) through (i) for each subsequent task and checkpoint, in accordance with the respective scheduler and checkpoint rules, until it is determined, using the processor, that a second predetermined condition has been reached.

19. The method of claim 18, wherein the predetermined second condition comprises determining that the process has finished.

20. The method of claim 18, wherein the predetermined second condition comprises checking a rule to determine whether the process has finished.

21. The method of claim 18, wherein the second predetermined condition of step (j) comprises at least one of the following:
    (i) receiving an instruction to process the tasks in a specific order;
    (ii) determining that data associated with the process has a predetermined value;
    (iii) completing one or more predetermined tasks;
    (iv) receiving an instruction to process the tasks in a specific order, wherein the specific order deviates from the order specified in at least one of the scheduler and checkpoint rules;
    (v) receiving a second request to perform a process, where the second request has a higher priority than the first request;
    (vi) determining that a task has not been scheduled properly;

(vii) determining that a task is unhealthy;
(viii) receiving an instruction to pause or stop the performing of the process;
(ix) determining that the process has finished.

22. The method of claim 18, further comprising polling during at least one of steps (a) through (j) to determine whether processing of a task occurred correctly.

23. A method for processing a logical thread, comprising the steps of:
   (a) dividing the logical thread into a plurality of processor functions;
   (b) modeling the state of the logical thread as a first task that is passed between processor functions, the first task comprising first task data and a first task state;
   (c) adding the first task to a queue of tasks;
   (d) persisting the first task in a first checkpoint, the first checkpoint comprising first checkpoint state data and at least a respective first checkpoint rule, wherein the first checkpoint state data comprises information about the state of the process and wherein the first checkpoint rule defines, based at least in part on at least one of the first checkpoint state data and a first predetermined condition, one or more of the plurality of tasks to be executed and the way in which the one or more tasks will execute;
   (e) selecting a first processor function for processing the first task in accordance with the first checkpoint rule;
   (f) receiving the first task at a first processor function and using the first task data to perform a first process on the task;
   (g) storing the output data from the first process in the first task;
   (h) persisting the first task in a second checkpoint, the second checkpoint comprising second checkpoint state data and at least a respective second checkpoint rule, wherein the second checkpoint state data comprises information about the state of the process and wherein the second checkpoint rule defines, based at least in part on at least one of the checkpoint state data and a second predetermined condition, one or more of the plurality of tasks to be executed and the way in which the one or more tasks will execute;
   (i) selecting a second processor function for processing the first task in accordance with the second checkpoint rule; and
   (j) receiving the first task at the second processor function, wherein the second processor function uses the output data from the first process, if necessary, as the input data to the second process.

24. The method of claim 23, further comprising repeating steps (e) through (j) until all processor functions are complete.

25. The method of claim 23, further comprising tracking task data that is used across processor functions.

26. The method of claim 25, further comprising removing the tracked task data when all processor functions are complete.

27. The method of claim 23, wherein the modeling further comprises modeling the state of the logical thread as a second task that is passed between processor functions, the second task comprising first task data and a first task state and further comprising the steps of:
   adding the second task to the queue of tasks;
   persisting the second task in a third checkpoint; and
   selecting the next task to be processed by the processor functions in accordance with a predetermined priority.

28. A computerized system for executing a process, the system comprising:
   means for receiving requests to execute a business process and for providing responses to the requests;
   means for processing incoming requests in accordance with a predetermined priority method;
   means for saving data relating to the state of processing of the incoming request at one or more checkpoints
   means for changing the way the business process executes based at least in part on the data relating to the state of processing; and
   means for recovering data from a checkpoint, to restore the business process.

29. The system of claim 28, further comprising means for checking the health of the business process.

30. The system of claim 28, further comprising means for pausing the business process to permit a higher priority activity to occur.

31. A computer-implemented method for performing a process, the method comprising:
   (a) receiving a request to perform a process, the process comprising a plurality of tasks and at least a scheduler rule
   (b) receiving a plurality of checkpoints associated with the process, each checkpoint comprising checkpoint state data and at least a respective checkpoint rule governing execution of the process;
   (c) determining a first task of the plurality of tasks to be scheduled into a priority queue, in accordance with the scheduler rule;
   (d) determining the first checkpoint of the plurality of checkpoints that is to be the first checkpoint used in processing the first task, in accordance with the scheduler rule;
   (e) creating the checkpoint state data for the first checkpoint;
   (f) saving the checkpoint state data for the first checkpoint;
   (g) processing the first task in accordance with the checkpoint rule associated with the first checkpoint;
   (h) determining the next task in the plurality of tasks to perform, based on the checkpoint rule associated with the first checkpoint;
   (i) updating the saved checkpoint data for the first checkpoint with the data and state associated with the first task;
   (j) repeating steps (c) through (i) for each subsequent task and checkpoint, in accordance with the respective scheduler and checkpoint rules, until an instruction is received to process the tasks in a specific order, the specific order deviating from an order specified in at least one of the scheduler and checkpoint rules.

32. A computer-implemented method for performing a process, the method comprising:
   (a) receiving a request to perform a process, the process comprising a plurality of tasks and at least a scheduler rule
   (b) receiving a plurality of checkpoints associated with the process, each checkpoint comprising checkpoint state data and at least a respective checkpoint rule governing execution of the process;
   (c) determining a first task of the plurality of tasks to be scheduled into a priority queue, in accordance with the scheduler rule;
   (d) determining the first checkpoint of the plurality of checkpoints that is to be the first checkpoint used in processing the first task, in accordance with the scheduler rule;
   (e) creating the checkpoint state data for the first checkpoint;

(f) saving the checkpoint state data for the first checkpoint'
(g) processing the first task in accordance with the checkpoint rule associated with the first checkpoint;
(h) determining the next task in the plurality of tasks to perform, based on the checkpoint rule associated with the first checkpoint
(i) updating the saved checkpoint data for the first checkpoint with the data and state associated with the first task;
(j) repeating steps (c) through (i) for each subsequent task and checkpoint, in accordance with the respective scheduler and checkpoint rules, until a determination has been made that a task has not been scheduled properly.

33. A method for processing a logical thread, comprising the steps of:
   (a) dividing the logical thread into a plurality of processor functions;
   (b) modeling the state of the logical thread as a first task that is passed between processor functions, the first task comprising first task data and a first task state;
   (c) adding the first task to a queue of tasks;
   (d) persisting the first task in a first checkpoint;
   (e) selecting a first processor function for processing the first task in accordance with a first rule;
   (f) receiving the first task at a first processor function and using the first task data to perform a first process on the task;
   (g) storing the output data from the first process in the first task;
   (h) persisting the first task in a second checkpoint;
   (i) selecting a second processor function for processing the first task in accordance with a second rule;
   (j) receiving the first task at the second processor function, wherein the second processor function uses the output data from the first process, if necessary, as the input data to the second process; and
   (k) modeling the state of the logical thread as a second task that is passed between processor functions, the second task comprising first task data and a first task state and further comprising the steps of:
      adding the second task to the queue of tasks;
      persisting the second task in a third checkpoint; and
   selecting the next task to be processed by the processor functions in accordance with a predetermined priority.

* * * * *

UNITED STATES PATENT AND TRADEMARK OFFICE
CERTIFICATE OF CORRECTION

PATENT NO. : 7,669,081 B2
APPLICATION NO. : 11/535723
DATED : February 23, 2010
INVENTOR(S) : Lett et al.

It is certified that error appears in the above-identified patent and that said Letters Patent is hereby corrected as shown below:

Col. 2, line 16, delete "let lets" and replace with --lets--.

Col. 2, line 38, delete "combatants)." and replace with --combatants.--.

Col. 3, line 56, delete "chron" and replace with --cron--.

Col. 4, line 2, delete "application-level." and replace with --application level.--.

Col. 4, line 13, delete "Task," and replace with --task,--.

Col. 5, line 32, delete "task" and replace with --task.--.

Col. 6, line 29, delete "task scheduler" and replace with --Task Scheduler--.

Col. 6, line 31, delete "task scheduler" and replace with --Task Scheduler--.

Col. 6, line 33, delete "task scheduler" and replace with --Task Scheduler--.

Col. 8, line 33, delete "program" and replace with --programs--.

Col. 9, line 21, delete "SCI itself 107." and replace with --SCI 107 itself--.

Col. 9, line 38-39, delete "mechanism restores 131" and replace with --mechanism 131 restores--.

Col. 9, line 40, delete "tasks" and replace with --task--.

Col. 9, line 58, delete "API's" and replace with --APIs--.

Col. 10, line 12, delete "that it is in" and replace with --that is in--.

Col. 10, line 34, delete "280." and replace with --180--.

Col. 11, line 23, delete "274)," and replace with --(274).--.

Col. 12, line 65, delete ", 13B," and replace with --, 136B,--.

Col. 13, line 1, delete "check point" and replace with --checkpoint--.

Col. 13, line 5, delete "present etc.)" and replace with --present, etc.)--.

Col. 13, line 8, delete "predetermined exists" and replace with --predetermined condition exists--.

Signed and Sealed this

Eighth Day of June, 2010

David J. Kappos
*Director of the United States Patent and Trademark Office*

CERTIFICATE OF CORRECTION (continued)
U.S. Pat. No. 7,669,081 B2

Col. 13, line 43, delete "B 136B," and replace with --136B,--.

Col. 14, line 5, delete "have their" and replace with --their--.

Col. 14, line 8, delete "message given" and replace with --message is given--.

Col. 14, line 44, delete "(block 330," and replace with --(block 330),--.

Col. 14, line 51, delete "is task" and replace with --is a task--.

Col. 14, line 65, delete ", AND" and replace with --, and--.

Col. 15, line 33, delete "occurs that" and replace with --that occurs--.

Col. 15, line 52, delete "job)" and replace with --job.--.

Col. 17, line 12, delete "Yes," and replace with --"Yes,"--.

Col. 17, line 33, delete " - interfaces." and replace with --interfaces.--.

Col. 18, line 11, delete "AND" and replace with --and--.

Col. 18, line 14, delete "and" and replace with --in--.

Col. 18, line 33-34, delete "state, data." and replace with --state data.--.

Col. 18, line 53, delete "Tasks)" and replace with --tasks)--.

Col. 18, line 65, delete "Task Processors" and replace with --TaskProcessors--.

Col. 21, line 4, delete "logic this" and replace with --logic so that this--.

Col. 21, line 67, delete "Task Scheduler" and replace with --TaskScheduler--.

Col. 22, line 2, delete "needs" and replace with --needs.--.

Col. 22, line 34, delete "a particular" and replace with --particular--.

Col. 24, line 34, delete "checkpoint" and replace with --checkpoint;--.

Col. 26, line 21, delete "rule" and replace with --rule;--.

Col. 26, line 54, delete "rule" and replace with --rule;--.

Col. 27, line 1, delete "checkpoint'" and replace with --checkpoint;--.

Col. 27, line 6, delete "checkpoint'" and replace with --checkpoint;--.